US010033595B2

(12) United States Patent
Sif et al.

(10) Patent No.: US 10,033,595 B2
(45) Date of Patent: Jul. 24, 2018

(54) SYSTEM AND METHOD FOR MOBILE NETWORK FUNCTION VIRTUALIZATION

(71) Applicant: Futurewei Technologies, Inc., Plano, TX (US)

(72) Inventors: Mehdi Sif, San Francisco, CA (US); Prakash Ramchandran, Santa Clara, CA (US); Hongbo Tian, Beijing (CN); Houxiao Han, Beijing (CN); Honglin Li, Fremont, CA (US); Mark X. Huang, San Jose, CA (US); Farhad Sunavala, San Ramon, CA (US); Galen Kim Davis, Sunnyvale, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 14/470,558

(22) Filed: Aug. 27, 2014

(65) Prior Publication Data

US 2015/0063166 A1 Mar. 5, 2015

Related U.S. Application Data

(60) Provisional application No. 61/870,740, filed on Aug. 27, 2013.

(51) Int. Cl.
*H04L 12/28* (2006.01)
*H04L 12/24* (2006.01)
(Continued)

(52) U.S. Cl.
CPC .......... *H04L 41/20* (2013.01); *G06F 9/45533* (2013.01); *G06F 9/45558* (2013.01);
(Continued)

(58) Field of Classification Search
CPC ............... G06F 9/45558; G06F 9/5077; G06F 9/45533; G06F 2009/4557;
(Continued)

(56) References Cited

U.S. PATENT DOCUMENTS 8,458,688 B2 6/2013 Ashok et al.
2006/0146821 A1 7/2006 Singh et al.
(Continued)

FOREIGN PATENT DOCUMENTS

CN 103037472 A 4/2013
CN 103052034 A 4/2013
(Continued)

OTHER PUBLICATIONS

PCT International Search Report and Written Opinion, International Application No. PCT/US2014/052972, Applicant: Huawei Technologies Co., Ltd, dated Dec. 18, 2014, 7 pages.
(Continued)

*Primary Examiner* — Noel R Beharry
*Assistant Examiner* — Lionel Preval
(74) *Attorney, Agent, or Firm* — Slater Matsil, LLP

(57) ABSTRACT

In one embodiment, a method for mobile network function virtualization (MNFV) includes creating an evolved packet core (EPC) cluster and associating a sub-network with the EPC cluster. The method also includes booting a virtual machine (VM) and attaching the VM to the EPC.

15 Claims, 17 Drawing Sheets

(51) Int. Cl.

| | |
|---|---|
| ***H04W 24/08*** | (2009.01) |
| ***G06F 9/455*** | (2018.01) |
| ***G06F 9/54*** | (2006.01) |
| ***H04W 4/50*** | (2018.01) |
| *H04L 12/713* | (2013.01) |
| *H04W 24/02* | (2009.01) |
| *H04W 12/06* | (2009.01) |

(52) U.S. Cl.
CPC .............. *G06F 9/541* (2013.01); *H04W 4/50* (2018.02); *H04W 24/08* (2013.01); *G06F 2009/45575* (2013.01); *H04L 45/586* (2013.01); *H04W 12/06* (2013.01); *H04W 24/02* (2013.01)

(58) Field of Classification Search
CPC ........... G06F 2009/45595; G06F 9/455; G06F 9/45537; H04L 67/08; H04L 49/70; H04L 41/20; H04L 45/586; H04W 4/003; H04W 24/02; H04W 48/18; H04W 4/00; H04W 84/02; H04W 8/02; H04W 24/08
USPC ...................... 370/254, 329; 718/1; 719/328; 709/220, 223
See application file for complete search history.

(56) References Cited

U.S. PATENT DOCUMENTS

| | | | | | |
|---|---|---|---|---|---|
| 2007/0094367 | A1* | 4/2007 | Esfahany | G06F 9/5077 | 709/223 |
| 2009/0193442 | A2* | 7/2009 | Orton | G06F 8/70 | 719/328 |
| 2010/0322255 | A1 | 12/2010 | Hao et al. | | |
| 2012/0033621 | A1 | 2/2012 | Mueck | | |
| 2012/0303835 | A1* | 11/2012 | Kempf | H04W 24/02 | 709/235 |
| 2012/0311157 | A1 | 12/2012 | Erickson et al. | | |
| 2013/0054763 | A1* | 2/2013 | Van der Merwe | H04W 8/12 | 709/220 |
| 2013/0058227 | A1 | 3/2013 | Lemieux | | |
| 2013/0124401 | A1 | 5/2013 | Del Real | | |
| 2013/0287021 | A1* | 10/2013 | Bulboaca | H04L 43/12 | 370/389 |
| 2014/0229945 | A1* | 8/2014 | Barkai | H04L 49/70 | 718/1 |
| 2014/0241247 | A1* | 8/2014 | Kempf | H04L 12/4633 | 370/328 |
| 2014/0259012 | A1* | 9/2014 | Nandlall | H04W 4/003 | 718/1 |
| 2014/0310707 | A1* | 10/2014 | Rajan | G06F 9/45533 | 718/1 |
| 2014/0362775 | A1* | 12/2014 | Steiner | H04W 76/045 | 370/329 |

FOREIGN PATENT DOCUMENTS

| | | | |
|---|---|---|---|
| CN | 103052038 | A | 4/2013 |
| EP | 1830515 | A1 | 9/2007 |
| RU | 2388044 | C2 | 4/2010 |
| WO | 2011159842 | A2 | 12/2011 |

OTHER PUBLICATIONS

Matsushima, S., et al., "Stateless User-Plane Architecture for Virtualized EPC (vEPC)," http://tools.ietf.org/html/draft-matsushima-stateless-uplane-vepc-01, Jul. 2013, 20 pages.

Catuneanu, V. M., et al.; "Optimal Topological Design of Large Telephone Networks"; Polytechnic Institute of Bucharest, Bucharest, Romania; Research Institute of Computer Techniques and Informatics, ITCI, Bucharest, Romania; Microelectronics Reliability, vol. 30, Issue 4, 1990, pp. 705-711.

Zhang, et al.; "Virtual Cluster Workspaces for Grid Applications"; XP003008896; University of Chicago, Argonne National Laboratory; 12 pages.

Wikipedia, "Adapter (computing)" https://en.wikipedia.org/w/index.php?title=Adapter_(computing)&oldid=550555002, XP055357700, Apr. 15, 2013, 2 pages.

Wikipedia, "Orchestration (computing)" https://en.wikipedia.org/w/index.php?title=Orchestration_(computing) &oldid=564751243, XP055357701, Jul. 18, 2013, 3 pages.

Wikipedia, "Request-response" https://en.wikipedia.org/w/index.php?title=Request-response&oldid=547613261, SP055357699, Mar. 29, 2013, 2 pages.

* cited by examiner

SYSTEM AND METHOD FOR MOBILE NETWORK FUNCTION VIRTUALIZATION

This application claims the benefit of U.S. Provisional Application Ser. No. 61/870,740 filed on Aug. 27, 2013, and entitled "Mobile Network Functions Virtualization," which application is hereby incorporated herein by reference.

TECHNICAL FIELD

The present invention relates to a system and method for wireless communications, and, in particular, to a system and method for mobile network function virtualization.

BACKGROUND

Networks may be managed using software based automation with application program interfaces (API).

The volume of data in mobile network operators (MNO) is increasing. Mobile network function virtualizations (MNFV) bridges networking, orchestration, and applications domains in mobile networks. MNFV supports a variety of infrastructure types, including traditional mobile infrastructures, virtualized network functions (CloudEPC), and mobile platforms as a service (MPaaS). MNFV may operate in decentralized function instantiation, centralized function instantiation, and intelligently distributed mobile network functions. Additionally, MNFV may use so decouple hardware and physical assets, such as arrangements involving licensed and unlicensed spectrum, mobile virtual network operators (MVNOs), and other mobile service delivery and enablement models. Also, MNFV may enable the cataloging, instantiation, and chaining of network functions with network-level services (service chaining) for rich services provided and to facilitate granular and standard mechanisms for the mobile network, the services and applications layers to exchange state, service level agreement (SLA), resources, and other information dynamically.

SUMMARY

An embodiment method for mobile network function virtualization (MNFV) includes creating an evolved packet core (EPC) cluster and associating a sub-network with the EPC cluster. The method also includes booting a virtual machine (VM) and attaching the VM to the EPC.

An embodiment method for mobile network function virtualization (MNFV) includes transmitting, by a controller to an element management system (EMS) an EMS call and transmitting, by the controller to a cloud management system (CMS), a CMS call after transmitting the EMS call. The method also includes receiving, by the controller from the EMS, an EMS response in accordance with the EMS call and receiving, by the controller from the CMS, a CMS response in accordance with the CMS call.

An embodiment computer includes a processor and a non-transitory computer readable storage medium storing programming for execution by the processor. The programming includes instructions to create an evolved packet core (EPC) cluster and associate a sub-network with the EPC cluster. The programming also includes instructions to boot a virtual machine (VM) and attach the VM to the EPC.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
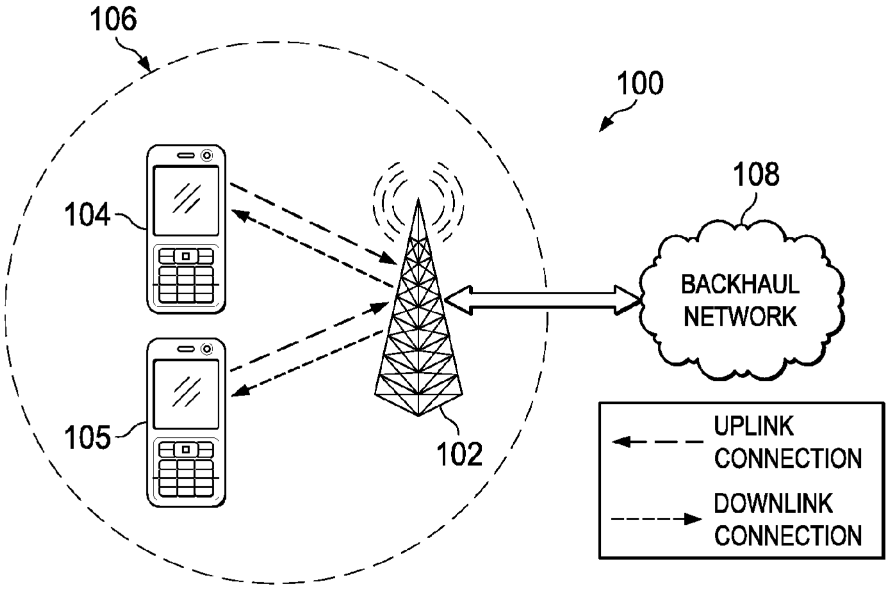
FIG. 1 illustrates a diagram of a wireless network for communicating data.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An embodiment QuantumLeap (QL) module is used in mobile network function virtualization (MNFV). In one embodiment, the QL module is installed as a part of a controller. The controller may work in concert with a compute module and a network module. A database is used for a northbound (NB) applications programming interface (API), while a southbound (SB) API may be a part of Open vSwitch Database Management Protocol (OVSDB) or Element Management System Database (EMSDB). A northbound API is an API which helps a particular network component communicates with higher level components. Conversely, a southbound interface communicates with lower level components. The southbound interface may be an OpenFlow™ protocol, which facilitates communication between a software defined network (SDN) controller and the physical and virtual network nodes, so the router discovers network topology, defines the network flows, and implements requests relayed via the northbound APIs. The northbound interface may be an area of protocol-supported communication between the controller and applications or higher layer control programs. QL may supply a standard API for information technology (IT) orchestration tools to instantiate mobile northwest functions. QuantumLeap may support a variety of modes of operation, including CloudEdge, on-demand, and elastic modes.

In an embodiment, there are five functions in a set for evolved packet core (EPC) operations. The functions include mobile management entity (MME), serving gateway (SGW), packet gateway (PGW), home subscriber service (HSS), and packed charging rules function (PCRF).

In some situations network and IT or application domains are blurred, with virtualization and dislocation of logical and physical assets. Also, there may be functional ranges of massively scalable and interconnected clusters. Applications, services, network functions, and virtualized topologies may be hosted by the same types of infrastructures, for example a cluster running OpenStack™.

OpenStack™ is a free open source cloud computing platform. OpenStack™ may be deployed as an infrastructure as a service (IaaS) solution. Technology used in OpenStack™ includes interrelated projects which control pools of processing, storage, and networking resources throughout a data center to be managed or provisioned through a web-based dashboard, command line tools, or a representational state transfer (REST)ful API.

OpenStack™ has a modular architecture with code names for its components. The Compute module, known as Nova, is a cloud computing fabric controller designed to manage and automate pools of computer resources. The Compute module may work with a variety of virtualization technologies, bare metal, and high performance computing (HPC) configurations. A hypervisor or virtual machine monitor (VMM) runs the virtual machines. Also, the Compute module runs external libraries with an architecture which scales horizontally.

OpenStack™ Object Storage module, known as Swift, is a scalable redundant storage system. Objects and files are written to multiple disk drives spread throughout servers in the data center, with the OpenStack™ software responsible for data replication and integrity across the cluster. Storage clusters scale horizontally by adding new servers. When a server or hard drive fails, OpenStack™ replicates its content from other active nodes to new locations in the cluster.

Also, the OpenStack™ Networking module, known as Neutron, formerly known as Quantum, is a system for managing networks and internet protocol (IP) addresses. OpenStack™ Networking reduces network bottleneck to facilitate users self-service. OpenStack™ Networking provides networking models for different applications or user groups. Models used include flat networks or virtual local area networks (VLANs) for separating servers and traffic. OpenStack™ Networking manages IP addresses, facilitating dedicated static IP addresses or dynamic host configuration protocol (DHCP). Floating IP addresses facilitates traffic being dynamically re-routed to compute resources, and traffic redirection during maintenance or in the case of a failure. Users may create their own networks, control traffic, and connect servers and devices to one or more networks. Administrators may use software defined networking (SDN), such as OpenFlow, for high levels of multi-tenancy and massive scale. OpenStack™ Networking has an extension framework for additional network services, such as intrusion detection systems (IDS), load balancing, firewalls, and virtual private networks (VPNs).

Additionally, OpenStack™ Identity, known as Keystone, provides a central director of users mapped to the OpenStack™ services available for access. Identity acts as a common authentication system across the cloud operating system, and may be integrated with other backend directory services, such as lightweight directory access protocol (LDAP). Also, Identity supports multiple forms of authentication, including standard username and password credentials, token-based systems, and Amazon Web Services (AWS)® logins. Additionally, the catalog provides a queryable list of the services deployed in an OpenStack™ cloud in a single registry.

The Telemetry module, known as Ceilometer, provides a single point of contact for billing systems, providing the counters to establish customer billing across OpenStack™ components. The delivery of counters is traceable and auditable. The counters are extensible to support new projects, and agents collecting data are independent of the overall system.

Additional OpenStack™ modules include Dashboard (Horizon), Image Service (Glance), Orchestration (Heat), Database (Trove), and Elastic Map Reduce (Sahara). OpenStack™ Dashboard provides administrators and users with a graphical interface to access, provision, and automate cloud-based resources. Also, Orchestration orchestrates multiple composite cloud applications using templates, both through OpenStack™ native REST API using Heat Orchestration Template (HOT) APIs and AWS® CloudFormation® compatible Query APIs. Database is a database-as-a-service provisioning relational and non-relational database engines. Electric Map Reduce is a service which facilitates data processing on OpenStack™ managed resources, including processing.

An embodiment model includes defining a standard IT or network (NW) interaction model and method for mobile networks. For example, access point name (APN), mobile virtual network operator (MVNO), subscriber, and policy instantiation or defined. A network owned IT hosted layer is used to integrate within platforms, such as OpenStack™ and CloudStack™, and applications, and within API repositories. In an embodiment, MNFV provides northbound and southbound mobile functionality, instantiation, and interactive methods and associated descriptors, which facilitates the integration of mobile NW functions with IT service mash-ups, such as OpenStack™, for service creation and orchestration.

A QuantumLeap plug-in agent on the OS or hypervisor may implement base classes to support the Virtual Network Functions (VNF) for EPC clusters, such as MME, SGW, and PGW for southbound, via Neutron. Some northbound and southbound functionality are accessed through epc.xml or pgw.xml or corresponding JavaScript Object Notation (JSON) format files. An associated OVSDB may be used for implementing OVS. Also, an ML2 plug-in may be used.

In southbound translation for pass-through plug-in requests and responses, the virtual machine or operating system utilities translate them through plug-in agents or drivers. A driver may be a switch or router (L2/L3) device (kernel level process), while an agent may be running on top of the operating system (OS) to assist the translation for software execution as a user level process.

FIG. 1 illustrates network 100 for communicating data. Network 100 includes communications controller 102 having a coverage area 106, a plurality of user equipments (UEs), including UE 104 and UE 105, and backhaul network 108. Two UEs are depicted, but many more may be present. Communications controller 102 may be any component capable of providing wireless access by, inter alia, establishing uplink (dashed line) and/or downlink (dotted line) connections with UE 104 and UE 105, such as a base station, an enhanced base station (eNB), an access point, a picocell, a femtocell, and other wirelessly enabled devices. UE 104 and UE 105 may be any component capable of establishing a wireless connection with communications controller 102, such as cell phones, smart phones, tablets, sensors, etc. Backhaul network 108 may be any component or collection of components that allow data to be exchanged between communications controller 102 and a remote end. In some embodiments, the network 100 may include various other wireless devices, such as relays, femtocells, etc. Embodiments may be implemented in UEs or communications controllers. Embodiments may be used in wireless networks, such as network 100.

System Architecture Exposure (SAE) is a core network architecture for 3$^{rd}$ Generation Partnership Project (3GPP) Long Term Evolution (LTE) wireless communications. SAE is the evolution of the general packet radio service (GPRS) Core Network with a simplified architecture, all-IP Network (AIPN), support for higher throughput and lower latency radio access networks (RANs), and support for and mobility between multiple heterogeneous access networks, including non-3GPP systems. SAE includes MME, SGW, PGW, HSS, Access Network Discovery and Selection Function (ANDSF), and Evolved Packet Data Gateway (ePDG).

The MME is a control node for access networks responsible for idle mode UE paging and tagging procedures, including retransmissions. The MME is involved in the bearer activation and deactivation processes, and for choosing the SGW for a UE at the initial attachment and during handover involving core network (CN) node relocation. Also, the MME performs authentication for users by interacting with the HSS.

The SGW routes and forwards user data packets, and acts as the mobility anchor for the user plane during inter-eNB handovers. Also, the SGW acts as the anchor for mobility between LTE and other 3GPP technologies. For idle state UEs, the SGW terminates the downlink data path and triggers paging when downlink data arrives for the UE. Additionally, the SGW manages resource usage records for policy enforcements and charging.

The PGW provides connectivity from the UE to external packet data networks as the point of exit and entry of traffic for the UE. A UE may have simultaneous connectivity with more than one PGW for accessing multiple public data networks (PDNs). The PGW performs policy enforcement, packet filtering for users, charging support, interception, and packet screening.

The HSS is a central database which contains user related and subscription related information. The HSS has functionalities such as mobility management, call and session establishment support, user authentication, and access authorization.

The ANDSF provides information to the UE about connectivity to 3GPP and non-3GPP access networks, such as Wi-Fi. The ANDSF assists the UE in discovering access networks in their vicinity, and provides policies to prioritize and manage connections to those networks.

The ePDG secures the data transmission with a UE connected to the EPC over an untrusted non-3GPP access.

Figure 2:
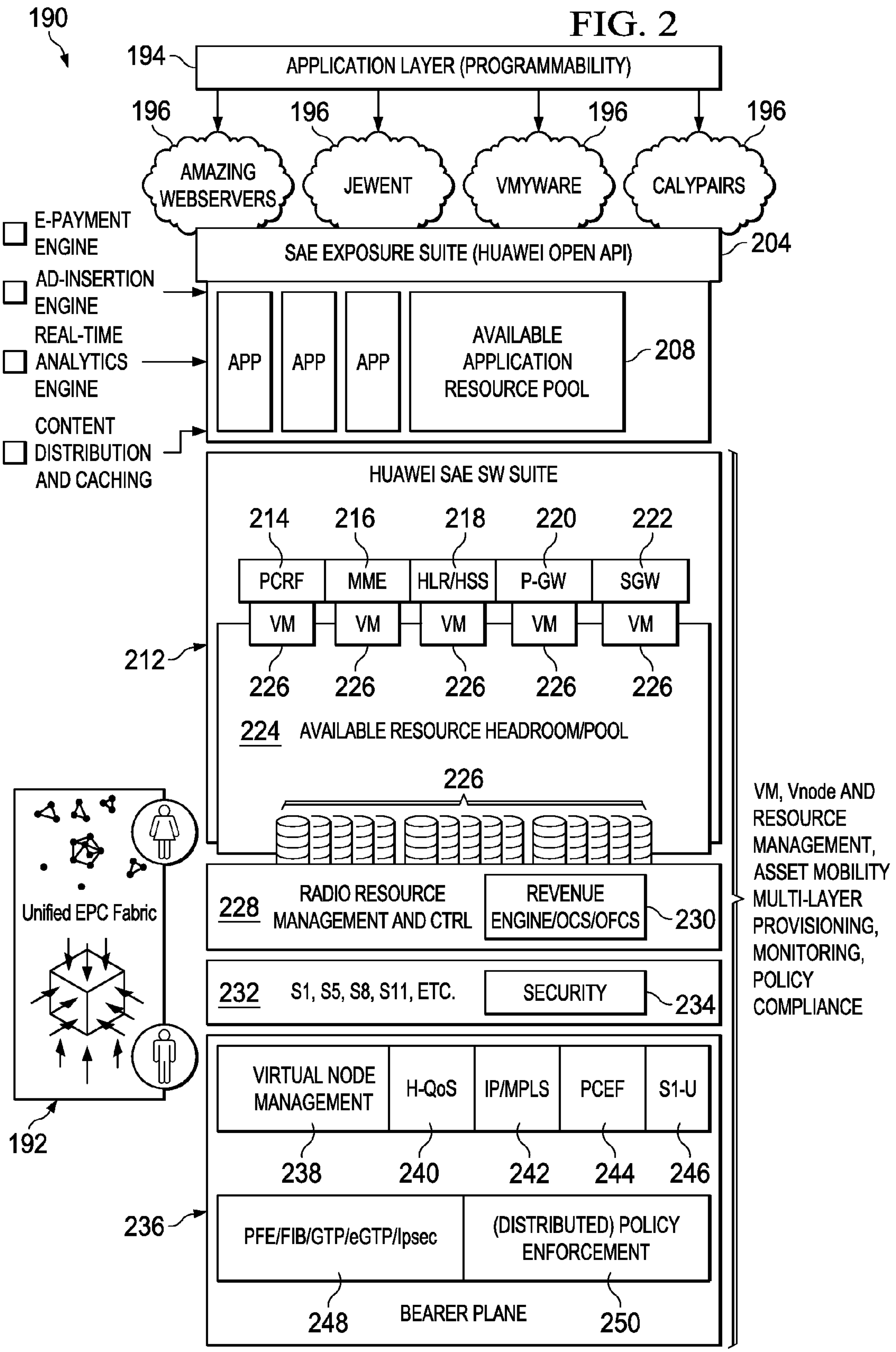
FIG. 2 illustrates an embodiment mobile network function virtualization (MNFV) system.

FIG. 2 illustrates MNFV 190, which may be used in a mobile system. MNFV 190 contains a shim layer, mobile function instantiation, and an IT/NW connector. Application layer 194 may use OpenStack™ and/or hyper-text mark-up language (HTML). Applications layer 194 selects functions 196, such as AWS®, Joyent® Cloud Services, VMware®, and Eucalyptus®. Functions 196 perform network value exposure, implementation design, publication, and API incubation.

SAE exposure suite 204 and applications 208 are used by e-payment engines, ad-insertion engines, real-time analytics engine, and content distribution and caching.

SAE Suite 212 includes PCRF 214, MME 216, HSS 218, PGW 220, and SGW 222. Virtual machines (VMs) 226 connect these modules with available resources.

Radio resource management and control block 228 and revenue engine 230 are used in EPC fabric 192, a unified EPC fabric, which is used for technology evaluation, benchmarking, and prototyping.

Compute resources include a cluster with load balancing, accelerators, virtualized nodes or clusters which are automated or managed. Networking resources may be speeds of 24-100 Tb/s, non-blocking with any-any connectivity and 100 Gigabit Ethernet (GE) optimized packet forwarding engine (PFE). There are also security modules 232 and 234 and bearer plane 236. Bearer plane 236 contains virtual node management module 238, Hierarchical Quality of Service (H-QoS) module 240, multi-protocol label switching (MPLS) module 242, Policy and Charging Enforcement Function (PCEF) 244, S1-U 246, PFE/forwarding information base (FIB)/GPRS tunneling protocol (GTP)/eGTP/Internet Protocol Security (Ipsec) 248, and policy enforcement 250, which may be distributed.

Mobile functions may be virtualized and instantiated using an API. Provision functions include create, configure, and test a virtual EPC network, create, configure, and test an MVNO, and create, configure, and test a machine to machine (M2M) network. Optimization and maintenance functions include configure EPC scaling parameters, scale the network, performance tuning, optimize the topology, perform dynamic provisioning, perform re-provisioning, manage fault, and manage software. Operation functions include APN, subscriber, policy, security, reports scheduling, maintenance service level agreements (SLAs), and M2M. Insights and intelligence functions include network intelligence (NI), subscriber intelligence (SI), application intelligence (AI), device intelligence (DI), reporting, network alerts, and service alerts. Additionally, service functions include service chaining, voice, Subscriber Management System (SMS), Module Management System (MMS), video conferencing, location, device capabilities, payment subscriber profile, Quality of Service (QoS) profile, M2M, and intelligence.

An embodiment includes an integrated platform with OpenStack™ for orchestration of services for MVNOs and carrier cloud. There is a separation of the service and management planes. An embodiment includes new methods for MVNO, policy control, and CloudEPC in terms of templates and attributes in accordance with carrier physical and virtual networks. Dynamic dimensioning based on time and traffic patterns is supported, including the use case for M2M/IOTs.

Table 1 illustrates examples for configuration and flow. GTP-v1U uses User Datagram Protocol (UDP) as the protocol and port 2152 for GPRS, Universal Mobile Telecommunications System (UMTS), and LTE. GTP-v1C uses UDP and port 2123 for GPRS and UMTS. Also, GTP-v2C uses UDP and port 2123 for LTE. Additionally, GTP' uses UDP for CDR with an unknown port. GTP-v2Cx uses UDP and port 2123 for VxLAN over SxV interface.

TABLE 1

| Tunnel Type | Protocol | Port | Usage |
|---|---|---|---|
| GTP-U (GTP-v1U) | UDP | 2152 | Data for GPRS, UMTS, and LTE |
| GTP-C (GTP-v1C) | UDP | 2123 | GPRS and UMTS |
| GTP-v2C | UDP | 2123 | LTE |
| GTP' | UDP/TCP | 3386 | CDR |
| GTP-v2Cx | UDP | 2123 | VxLan over SxV interface |

A variety of templates may be used for virtual network functions. Policies are enforced by the tenant, and are specific to the group of users. Some example templates include Template_MVNO(Tenant, SP), Template_EPC(Tenanat, ITDelegate, Capacity, Delay, MME, PGW, SGW), Template_Service(ServiceName, Tenanat, SP, ServiceID, EpcID, PolicyID, ApnID), Template_APN(ApnName, ApnID, Tenanat, SP), Template_Policy(PolicyName, PolicyID, Tenant, SP), Template_Subscriber(SubscriberProfileID, Tenant, SP), Template_Tunnel(Type, Endpoints(n), Capacity, TEID), and Template_DNS(ReolverID, PrivateFlag, IPAddress, Port, Protocol, ForwardingID).

In the use case, a RESTful API (create, read, updated, and delete (CRUD)) is used for video chat creation. Video chat is a composite of two functions, video service and chat service. CRUD is applicable for point-to-point or point-to-multipoint. For point-to-point, there are two service creations, with the support of those services through service orchestration. QL API supports service orchestration via templates. The state machine of open mobile controller supports orchestration unique to QL for integration with OpenStack™. Thus, the OpenStack™ IaaS is enabled for template orchestration to support the unique designated templates.

A mobile network operator (MNO) is a generic term for operators who operate mobile networks. A MVNO provides end-to-end (E2E) services without owning all assets, but may share or operate a subset as RAN or EPC functions, while the physical asset owner (PAO) owns the assets. Examples of assets include servers, storage, network (NW) physical assets, spectrum, and software (SW) assets or code. For example, Spectrum, Compute, Storage, Network Cluster, IP Address, and virtual local area network (vLAN) address are assets. The mobile asset operator (MAO) operates physical nodes or virtual mobile functions within defined administrative domains. A physical mobile asset owner (P-MAO) is a physical mobile asset operator. A virtual mobile asset owner (V-MAO) operates and allocates a virtual context to an MVNO. A mobile platform as a service (MpaaS) or virtual mobile network operator (VMNO) is like a local access as a service (laaS) for cloud operated and cloud delivered mobile service network functions.

Figure 3:
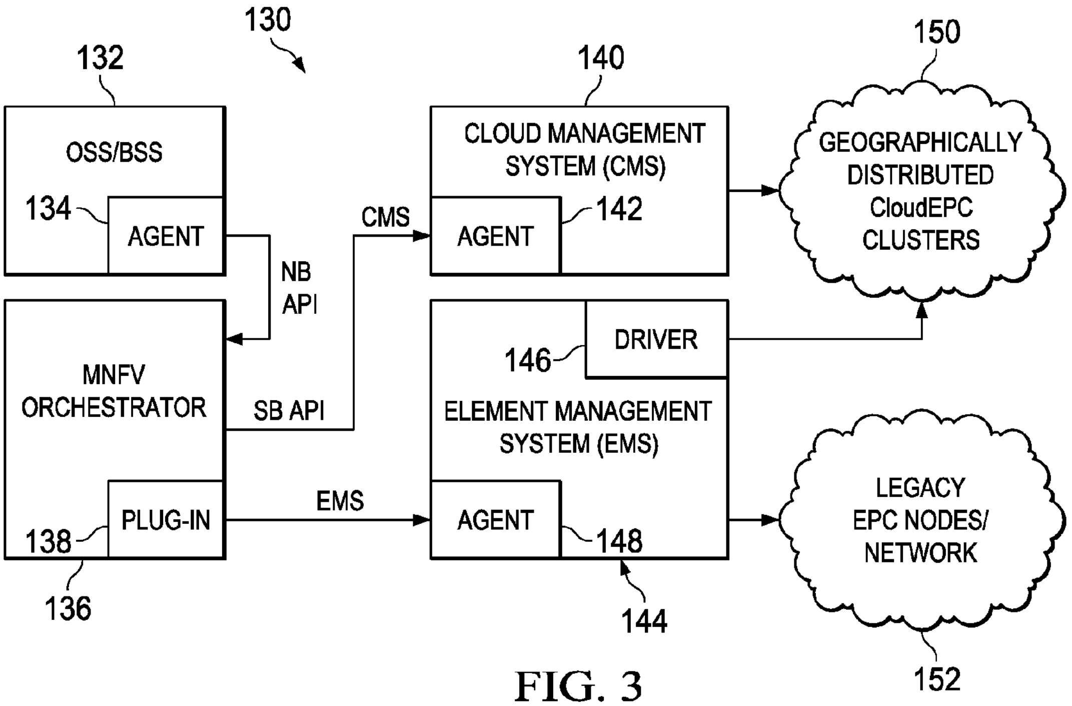
FIG. 3 illustrates another embodiment MNFV system.

FIG. 3 illustrates system 130 for handling physical and virtual mobile networks. Operation support system (OSS)/business support services (BSS) block 132 contains agent 134. The northbound API goes from OSS/BSS block 132 to MNFV 136, the orchestrator.

MNFV 136 contains plug-in 138, which may be the QuantumLeap plug-in. The southbound API goes to cloud management system (CMS) 140, which has agent 142. Examples of CMSs include OpenStack™, CloudStack®, Eucalyptus®, CloudFoundry®, and proprietary clouds, such as Vcloud Director® and AWS®.

Also, from MNFV 136, there is a connection to agent 148 in element management system (EMS) 144. EMS 144 communicates with network 152, legacy EPC nodes and network. Network 152 is a legacy physical EPC cluster or network. Driver 146 in EMS 144 communicates with network 150, geographically distributed CloudEPC clusters. Network 150 may be managed by CMS 140 and/or EMS 144. Network 150 is a virtual cloud EPC with a router between the interconnections between the L2/L3 layers in the network stacks. These may be bridging like vLAN or virtual extended local area networks (VxLAN) over Ethernet, Internet Protocol version 4 (IPv4), Internet Protocol version 6 (IPv6), or IP or MPLS at layer 2.5

The bypass adapter bypasses CMS 140 and chooses the EMS 144 from MNFV 136 to EMS 144 to either network 152 or network 150.

A high level plug-in request from MNFV 136 may be passed through EMS 144 to network 150 or network 152. Alternatively, the plug-in request is directly passed to network 150 or network 152. The agent's runtime may be implemented via a puppet master on MNFV 136 for remote execution. The remote executor of orchestration may be performed by an agent or a driver, depending on whether it is an OS, hypervisor, or OVS is an L2 switch, an L3 switch, or a router for the adaptor. An adapter is a non-OpenStack™ plug-in, such as an EMS or a Puppet module. A QuantumLeap adapter implementation may be adjusted for MNFV services to match attributes with API extensions for Neutron. Other non-matching attributes, such as EPC network latency and delay budgets, may have different limits for mobile networks.

Northbound and southbound objects are created through REST calls, such as post, get, put, and delete, corresponding to create (C), return (R), update (U), and delete (D) structured query language (SQL) calls. C is used in create operations, R is used to return the attribute in response for show or list operations, U updates the value of the attribute, and D deletes the value of the attribute.

A high level task flow involves creating an EPC cluster. Then, subnets are associated with the EPC cluster, and a VM or VNF attached to the EPC cluster is booted. Clean-up includes deleting the VM or VNF, deleting ports associated with the EPC cluster, and deleting the EPC cluster. Subnets associated with the EPC cluster are deleted.

Figure 4:
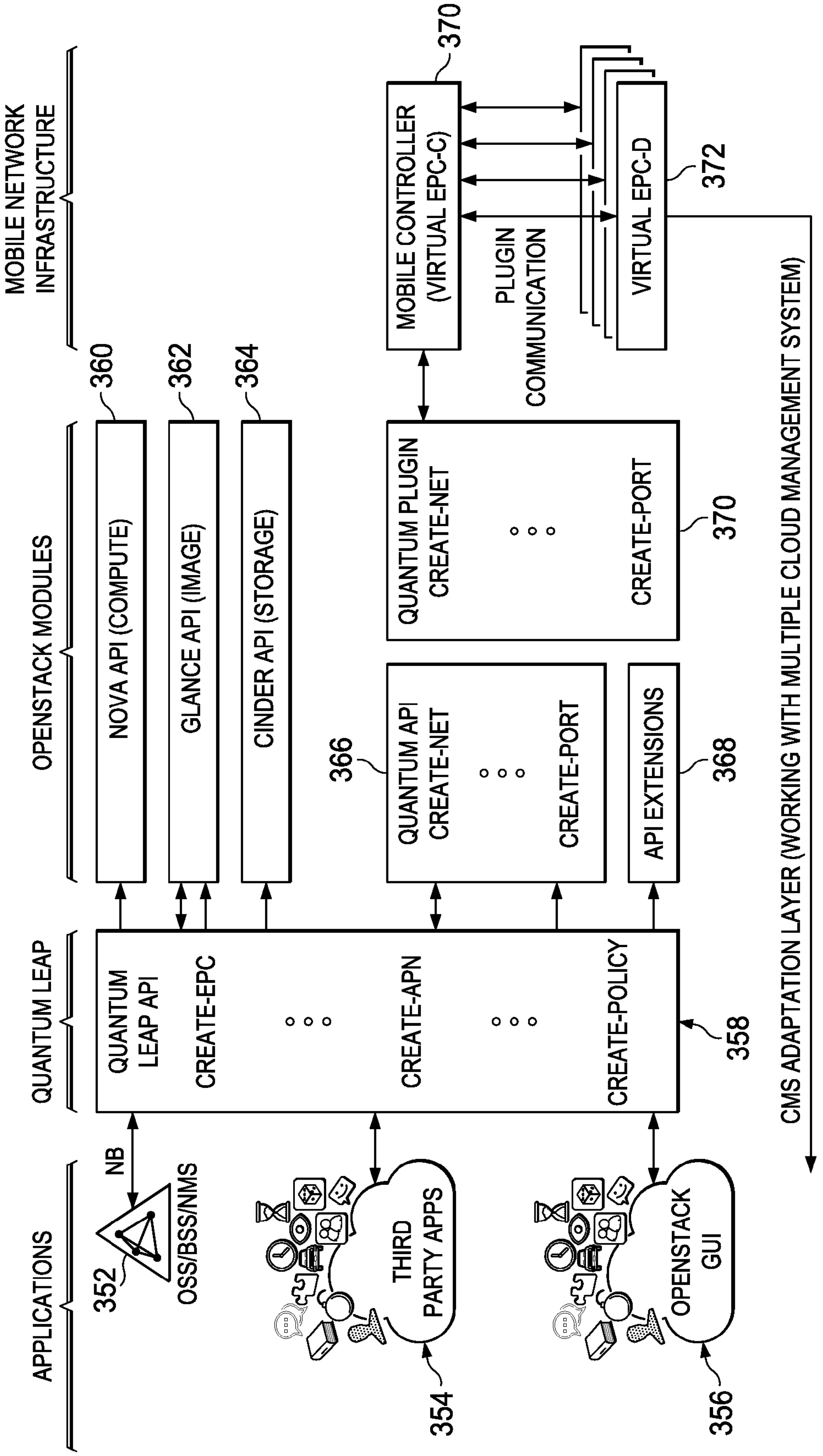
FIG. 4 illustrates an additional MNFV system.

FIG. 4 illustrates the operation of MNFV in an OpenStack context using QuantumLeap. QuantumLeap module 358 is a QuantumLeap engine with QuantumLeap APIs. The QuantumLeap APIs have a variety of functions, such as Create EPC, create APN, and create policy. QuantumLeap module

358 communicates with OSS/BSS/Network Management System (NMS) 352 northbound, interfacing with 3rd party applications 354 and OpenStack™ graphical user interface (GUI) 356. A CMS adaptation layer works with multiple cloud management systems, to communicate with virtual EPC-Ds 372.

Also, QuantumLeap interacts with a variety of OpenStack™ modules. Some examples of OpenStack™ modules which may be used include NOVA API 360 (Compute), Glance API 362 (Image), Cinder API 364 (Storage), Quantum API 366 with Create-net and Create-port, API extensions 368, and quantum plug-in 370. Quantum Plug-in 370 contains create-net and create-port operations.

The QuantumLeap plug-in operates in a mobile network infrastructure containing mobile controller 370, which works with the data plane products from multiple vendors. Mobile controller 370 communicates with virtual EPC-Ds 372.

Figure 5:
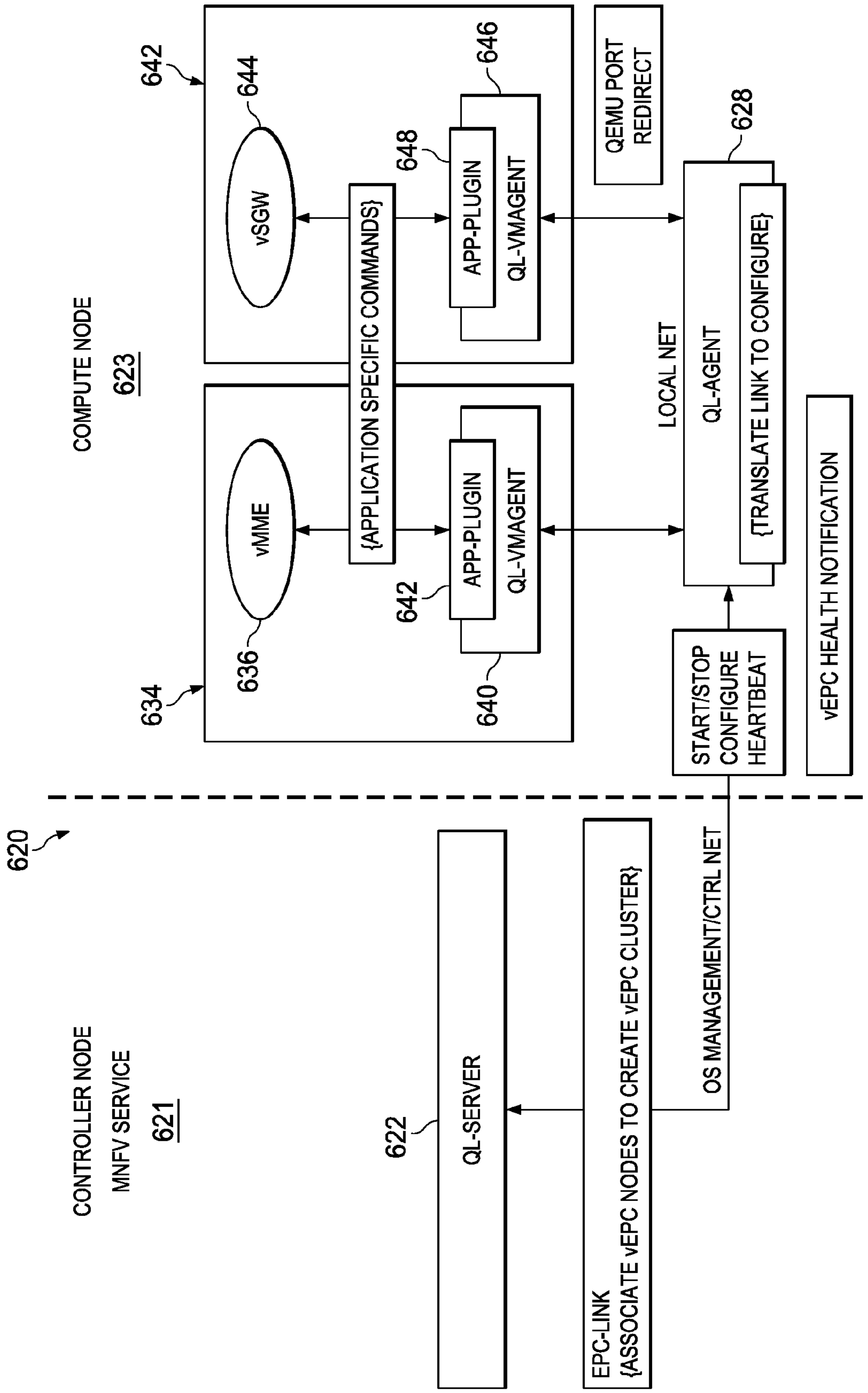
FIG. 5 illustrates an embodiment system for applications management.

FIG. 5 illustrates system 620 for application management with a VM agent using QuantumLeap. System 620 includes controller node 621, which provides MNFV service, and compute node 623. Controller node 621 contains QL server 622, which is a proxy from northbound. An EPC link associates Virtual EPC (vEPC) nodes to create a vEPC cluster. OS management and control networks are passed between QL server 622 and QL agent 628 in compute node 623. Messages in the controller node include remote procedure call (RPC) protocol, QuantumLeap API, Hello Messages, link up and down, bandwidth, and delay to meet SLAs for MNOs.

Compute node 623 contains QL agent 628, node 634, and node 642. Node 634 contains virtual MME (vMME) 636, QL virtual management block 640, and application plug-in 642, while node 642 contains virtual SGW (vSGW) 644, QuantumLeap virtual management 646, and application plug-in 648. There are application specific commands within the compute nodes. The compute nodes have agents. QL agent 648 translates links to be configured. Other commands between the nodes and QL agent include queue emulator (QEMU) port, redirection, start, stop, configure, and heartbeat. vEPC health notification is performed. Nova handles the virtual interface (VIF) for port redirection. The QEMU port redirection is performed with port mapping. A VM or host performs accessing using endpoint group policy (EGP).

Some example QuantumLeap command line orchestration samples for EPC includes:

```
qleap <commands> [options] [arguments] Commands: List Template
V-MME v-SGW v-PGW v-PCRF v-HSS v-eNB
Stack(Begin)
getTemplate (v-MME)
get Interface(CIO_S1-MME, CIO_S6a, CIO_S11)
getTemplate(v-SGW)
get Interface(DIO_S1-U, DIO_S5, DIO_S8)
getTemplate(v-PGW) getInterface(, DIO_S5, DIO_S8, DIO-SGi )
config Switch Huawei 9811 Port 1-6
link v-SGW.DIO_S5 v-PGW.DIO_S5 BW=10Gb P1-P2
link UE-eNB-to-E-LA v-MME CIO_S1-MME=1Gb P3-P4
link UE-eNB-to-ELAN v-SGW.DIO_S1_U =10Gb P5-P6
connect QLeap mySQL Openstakc.DB.ODBC
Group (v-MME, v-SGW, v-PGW) name CloudEPC
Stack(Commit), Build stack , Instantiate stack , Monitor stack
```

Figure 6:
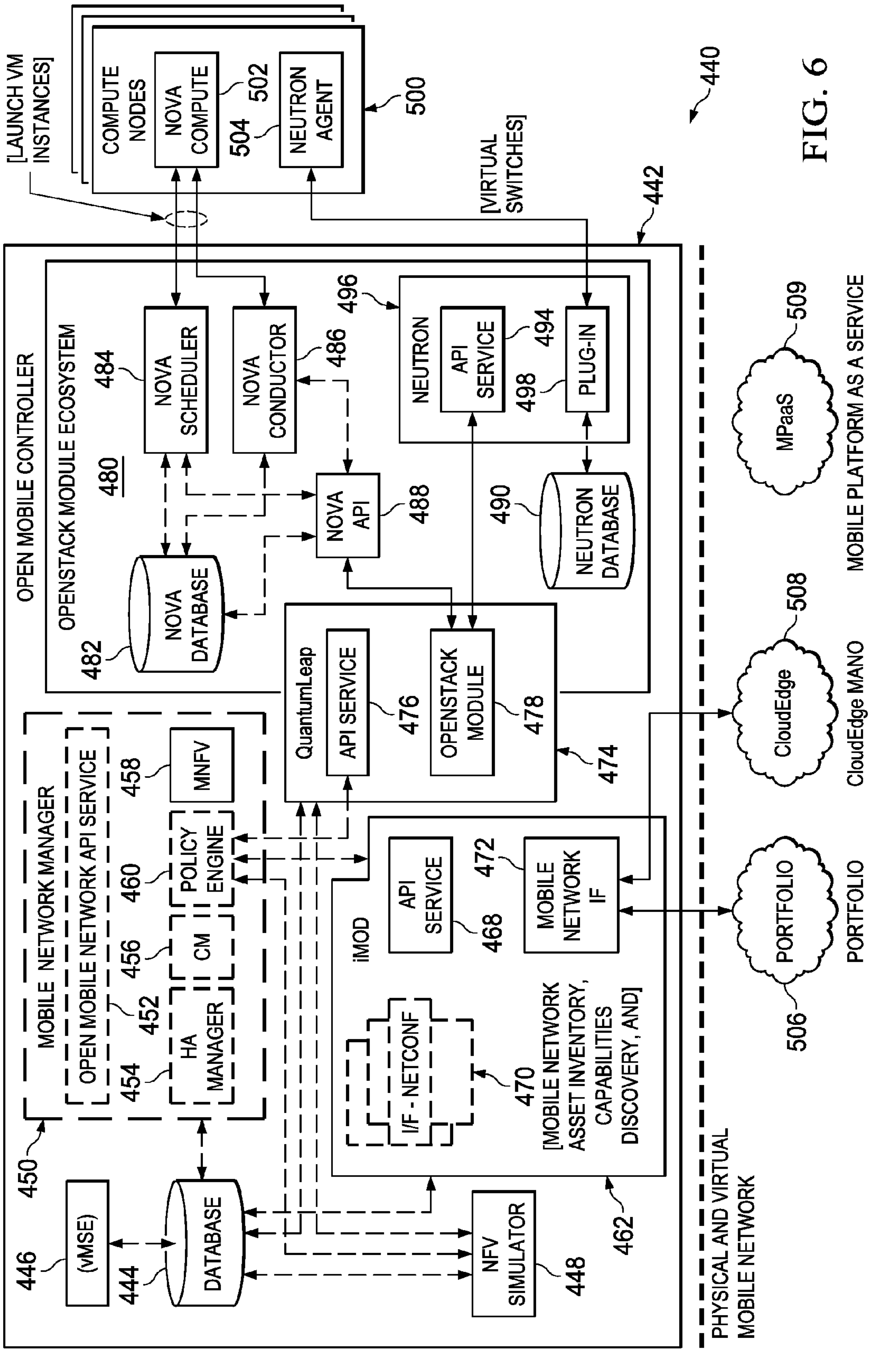
FIG. 6 illustrates an embodiment system for an application programmable interface (API)

FIG. 6 illustrates system 440 for a REST API which configures and manages networks and SLAs. Controller 442 contains OpenStack™ module 480, which performs a variety of OpenStack™ functions, including a Nova database 482, which is coupled to Nova scheduler 484, Nova conductor 486, and Nova API 488. Nova scheduler 484 and Nova conductor 486 are coupled to Nova Compute module 502 in compute nodes 500. Nova conductor 486 provides support for compute nodes 500 which do not access Nova database 482. Nova scheduler 484 determines how to dispatch compute and volume requests.

Nova API 488 interacts with QuantumLeap module 474, which provides API service 476 and contains OpenStack™ module 478. Orchestration and control are provided by the QuantumLeap module, which communicates with Nova API 488 and neutron 496, which contains API service 494 and plug-in 498. Neutron 496 communicates with agent 504, a Neutron and/or QuantumLeap host agent, in compute nodes 500. Also neutron module 498 accesses database 490, a Neutron and/or QuantumLeap database.

IMOD module 462, which interacts with QuantumLeap module 474, is a web based cloud computing provider. IMOD module 462 contains API service 468, mobile network 472, and I/F net conferencing modules 470. In one example, IMOD module 462 and QuantumLeap module 474 are co-located. Alternatively, IMOD module 462 and QuantumLeap module 474 are distributed. Mobile network IF 472 accesses virtual and physical networks, such as portfolio 506, CloudEdge Management and Orchestration (MANO) 508, and MPaaS 509.

Mobile network manager 450 communicates with IMOD module 462 and QuantumLeap module 474. Mobile network manager 450 contains open mobile network API service 452, MNFV 458, high availability (HA) manager 454, content manager (CM) 456, and policy engine 460.

Database 444 is accessed by mobile network manager 450, QuantumLeap Module 474, IMOD module 462, and virtual mobile subscriber equipment (vMSE) 446. vMSE 446 accesses network function virtualization (NFV) simulator 448, which is used to simulate a network.

Figure 7:
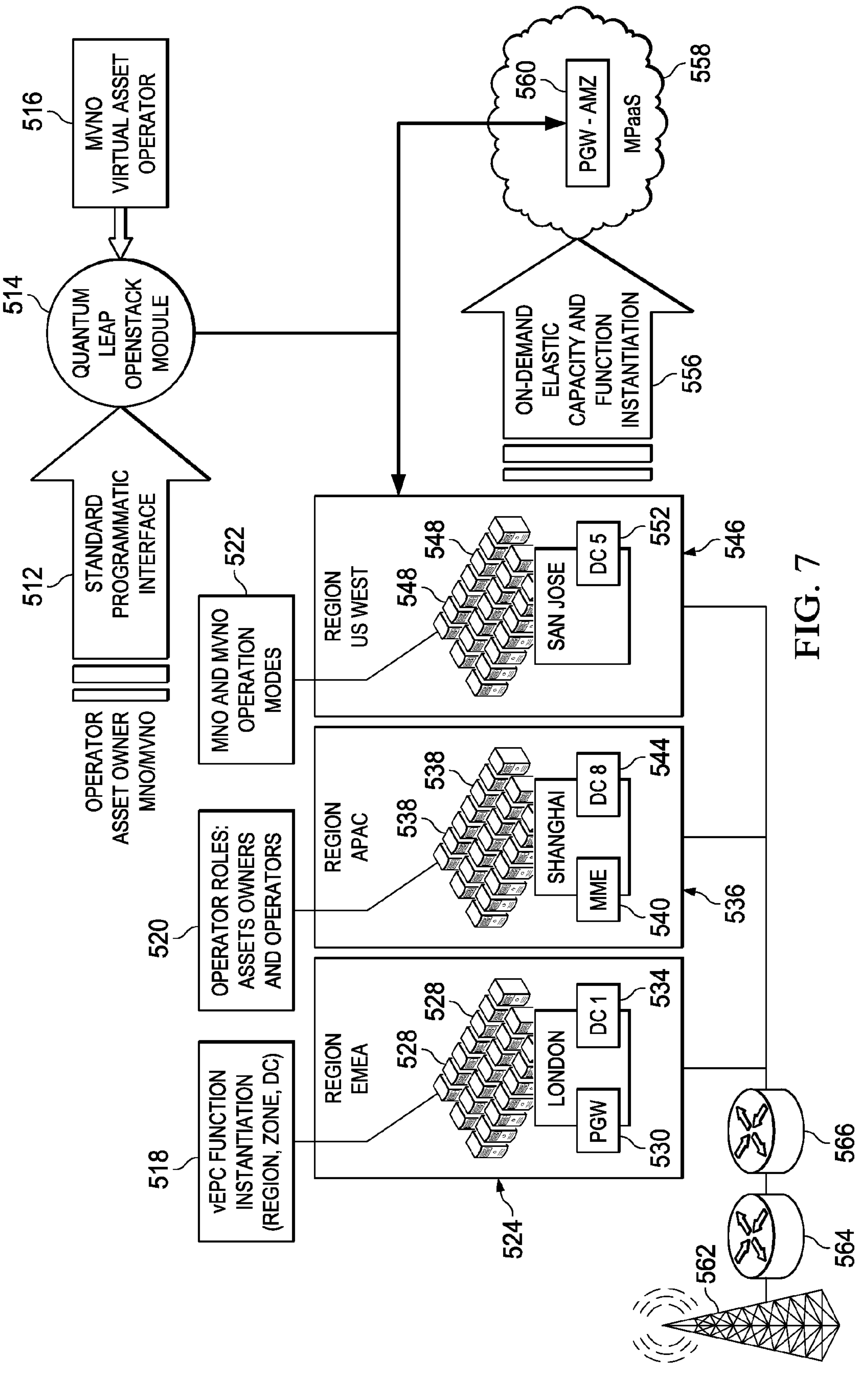
FIG. 7 illustrates an embodiment mobile network operator (MNO)

FIG. 7 illustrates MNO use with MNFV and QuantumLeap with an IT conduit into the mobile domain. Operator asset owners, such as MNOs and MVNOs, use programmatic interfaces 512 to interact with QuantumLeap module 514, and OpenStack™ modules. MVNO 516 accesses QuantumLeap module 514, which performs vEPC instantiation 518, for example a region, zone, and data center. In this example, there are three regions, region Europe the Middle East and Africa (EMEA) 524, region Asia Pacific (APAC) 536, and region US West 546. The operator roles are determined in block 520. The asset owners and operators are determined. Also, MNO and MVNO operation modes are determined in block 522. This is sent to PGW 560 in MPaaS 558.

Region EMEA 524, in London, contains servers 528, PGW 530, and DC 534. Also, region APAC 536, located in Shanghai, contains servers 538, MME 540, and DC 544. Additionally, region US west 546, located in San Jose, contains servers 548 in DC 552. The regions contain communications controller 562 and firewalls 564 and 566. On demand elastic capacity and function instantiation is performed in block 556.

Figure 8:
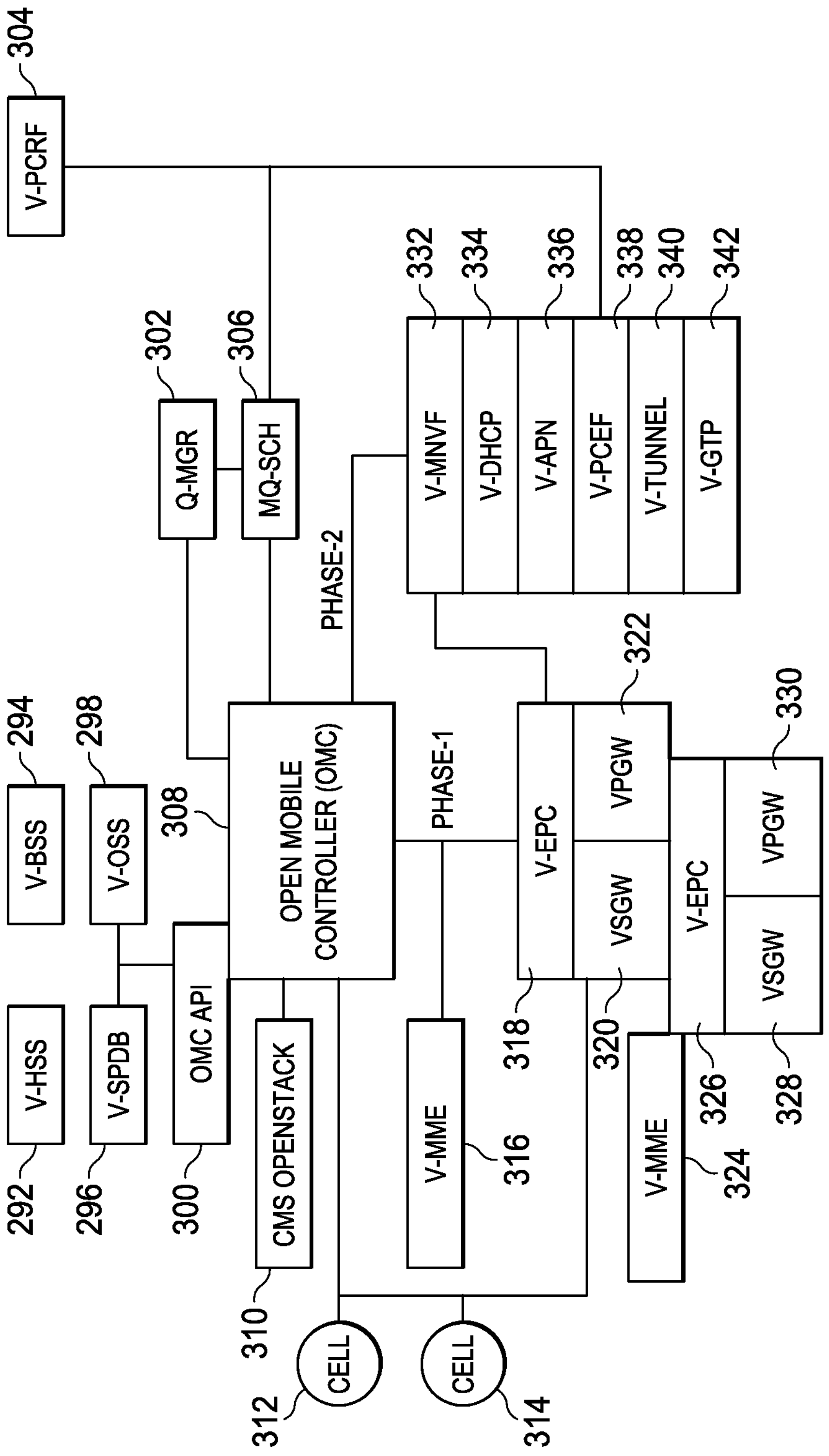
FIG. 8 illustrates a functional view of an embodiment evolved packet core (EPC)

FIG. 8 illustrates a functional view of EPC entities to be instantiated via MNFV function calls. Open Mobile Controller (OMC) 308 runs CMS OpenStack™ 310, and OMC API 300. OMC API 300 communicates with virtual stored procedure database (vSPDB) 296 to virtual HSS (vHSS) 292 and virtual OSS (vOSS) 298 to virtual BSS (vBSS) 294. OMC 308 also uses MQ-Sch 306, virtual PCRF (vPCRF) 304, Q-Mgr 302, cells 312 and 314, and vMME 316. In phase 1, vEPC 318, vSGW 320, virtual PGW (vPGW) 322, vMME 324, vEPC 326, vSGW 328, and vPGW 330 are used. Also, in phase 2, virtual MNVF (vMNVF) 332, virtual DHCP (vDHCP) 334, virtual APN (vAPN) 336, virtual PCEF (vPCEF) 338, virtual tunnel (vTunnel) 340, and virtual GTP (vGTP) 342 are used. The list, show, create, update, and delete functions are available for NW Function, MVNO, access point (AP_Subscriber, Tunnel, Session, Policy, and switched virtual circuits (SVCs). The MNFV may use an OpenFile controller, which is provider created and geographically distributed.

Figure 9:
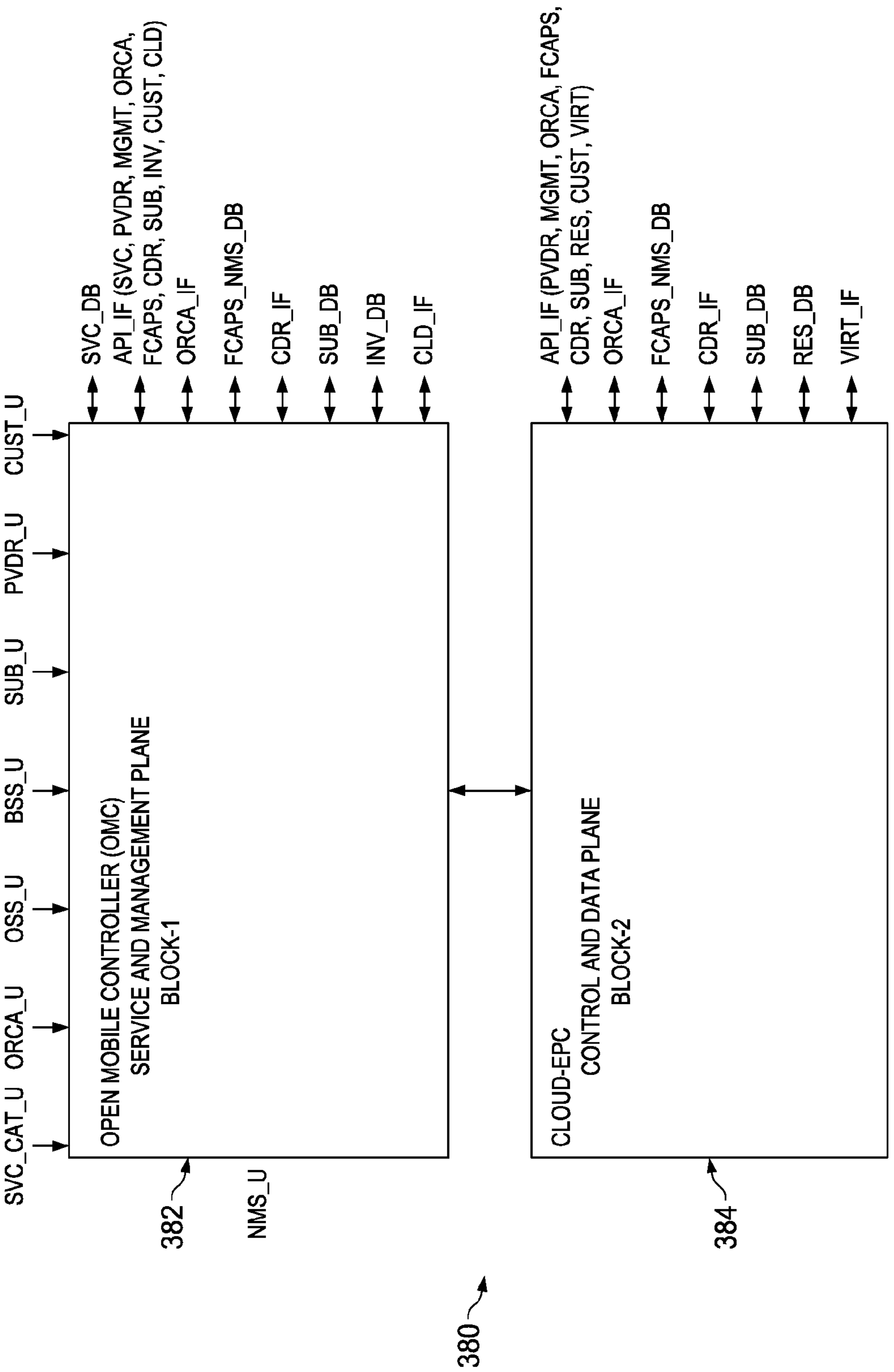
FIG. 9 illustrates an embodiment architecture of an open mobile controller (OMC)

FIG. 9 illustrates architecture 380 for an OMC. OMC 382 is coupled to Cloud-EPC control and data plane 384. Architecture 380 is an end-to-end GTP carrier domain tunneling protocol.

Figure 10:
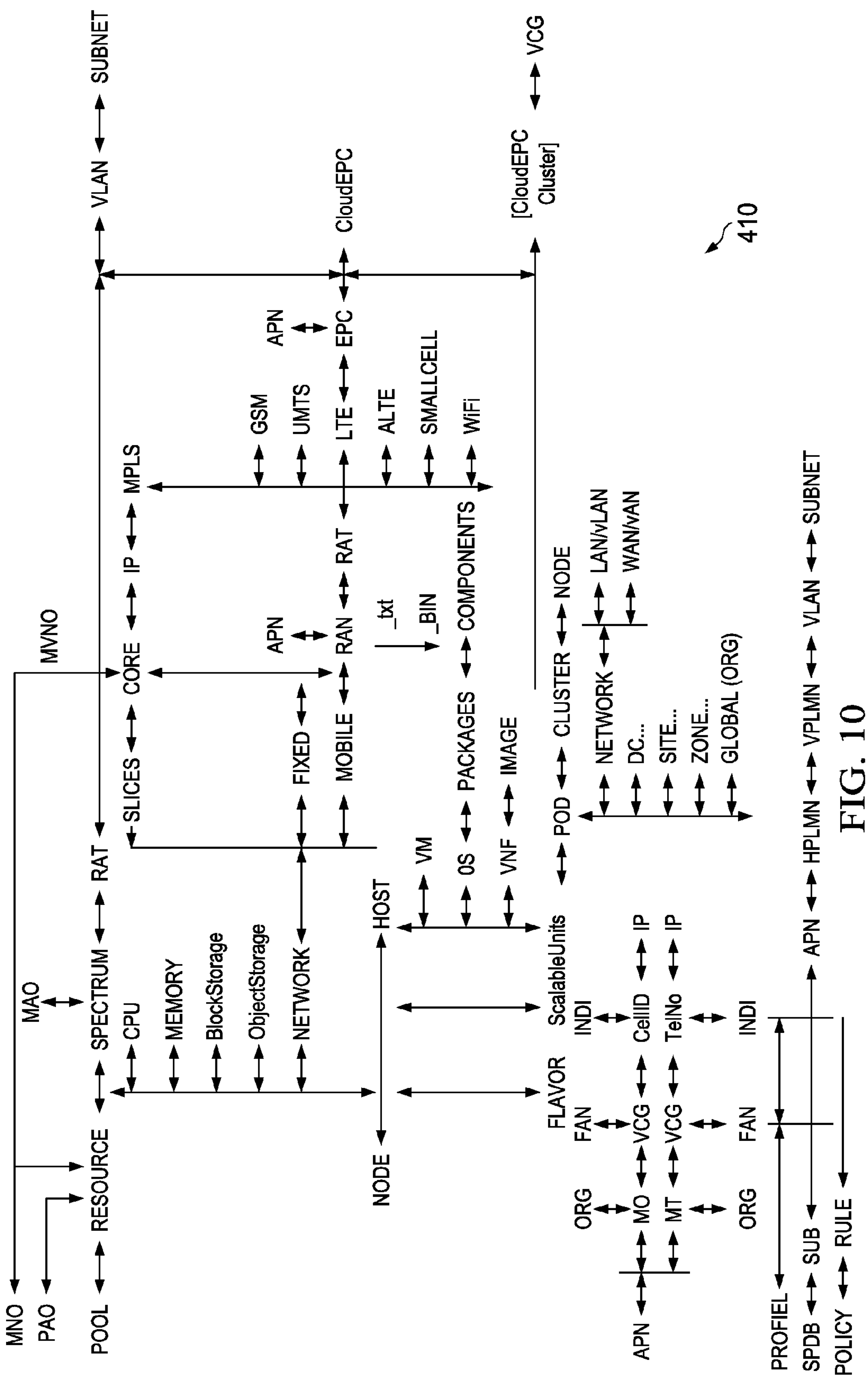
FIG. 10 illustrates an object schema diagram of an embodiment OMC.

QuantumLeap database 398 is a database similar to other OpenStack™ modules based on one database per module. FIG. 10 illustrates object schema diagram 410 for an implementation. The object schema may be ported to a SQL or NoSQL database based on scalability and response requirements.

In an embodiment, MNFV covers networks which use 3GPP LTE releases as their macro cells.

Additionally, APIs create, read, update, and delete an Access Point Name (APN) and assign it to the virtual Cloud Group (VCG). The VCG may be represented by a group of virtual cloud EPC descriptors "VC_EPC_D" or by a group of radio cells assigned to one or more Mobile Management Entity (MME), referred to as a virtual cell descriptor "VC_RAN_D."

Figure 11:
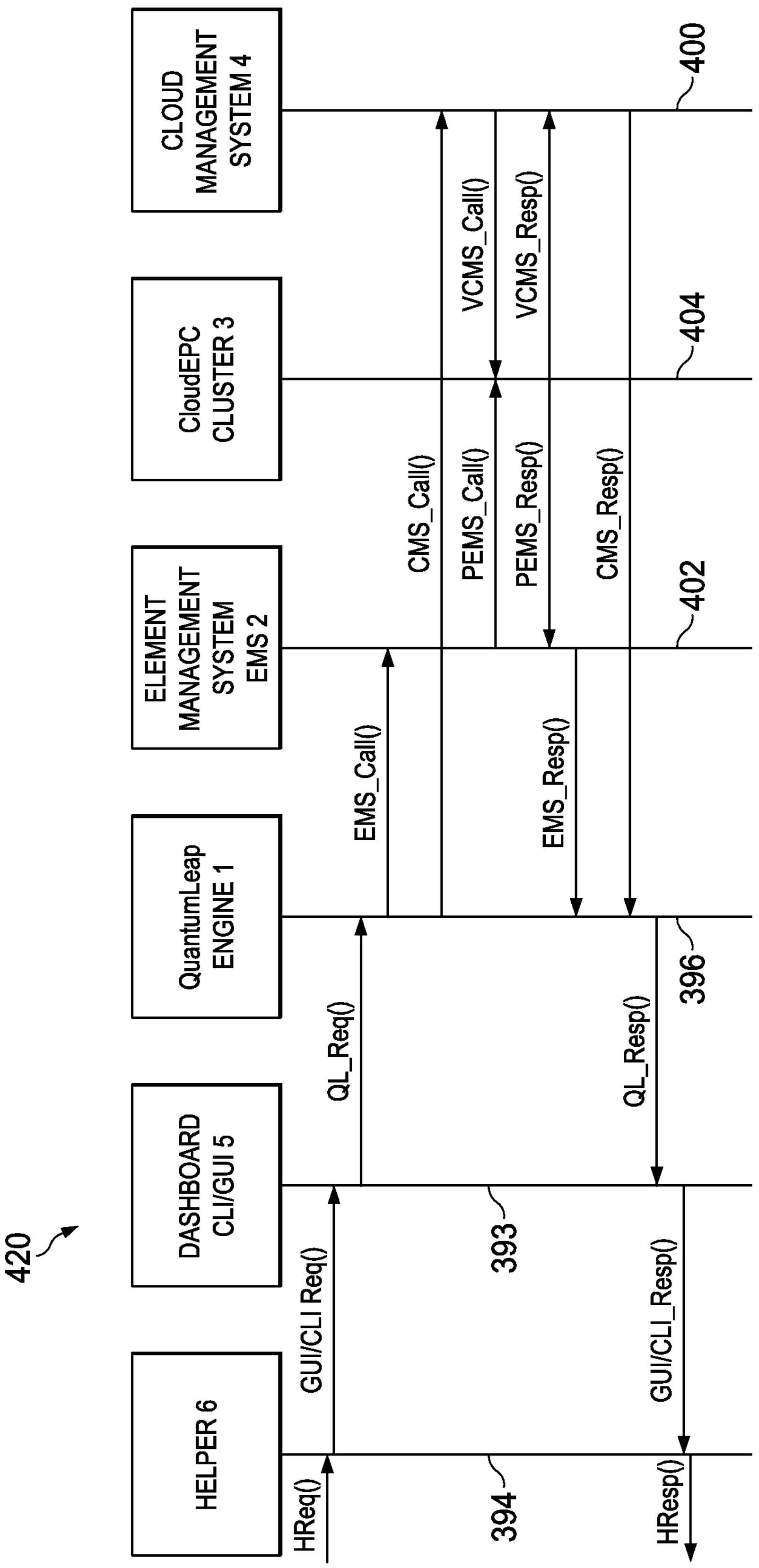
FIG. 11 illustrates a message flow diagram for an applications programming interface (API) method.

FIG. 11 illustrates message diagram 420 depicting a request and response flow end-to-end for an example API call from the application level to the infrastructure level. There are communications between helper module 394, dashboard 393, QuantumLeap module 392, EMS cluster 402, EPC cluster 404, and CMS 400. A request from the helper module HReq( ) is sent to the dashboard. The helper forwards a request GUI/CLI(Req) to the dashboard, which is a command line or GUI dashboard. The dashboard then sends a request QL_Req( ) to the QuantumLeap engine, and the QuantumLeap engine sends EMS_Call( ), which is based on QL_Req( ), to the EMS. Also, the QuantumLeap engine sends CMS_Call( ) to the CMS, which is based on QL_Req( ).

Then, the CMS sends VCMS_Call( ) to the EPC cluster. The EPC cluster responds with VCMS_Resp( ). The EMS sends EMS_Resp( ), a response from the EMS to the QL engine for work requested, to the QuantumLeap engine.

Also, the EMS sends PEMS_Call( ), the physical EMS call, to the EPC cluster. The EPC responds with PEMS_Resp( ), the physical EMS call response. The CMS sends CMS_Resp( ), a response from the CMS to the QL engine for work requested, to the QuantumLeap engine.

The QuantumLeap engine sends QL_Resp( ), a response, to the dashboard. Then, the dashboard sends GUI/CLI_Resp( ) to helper. The helper then forwards HResp( ).

Figure 12:
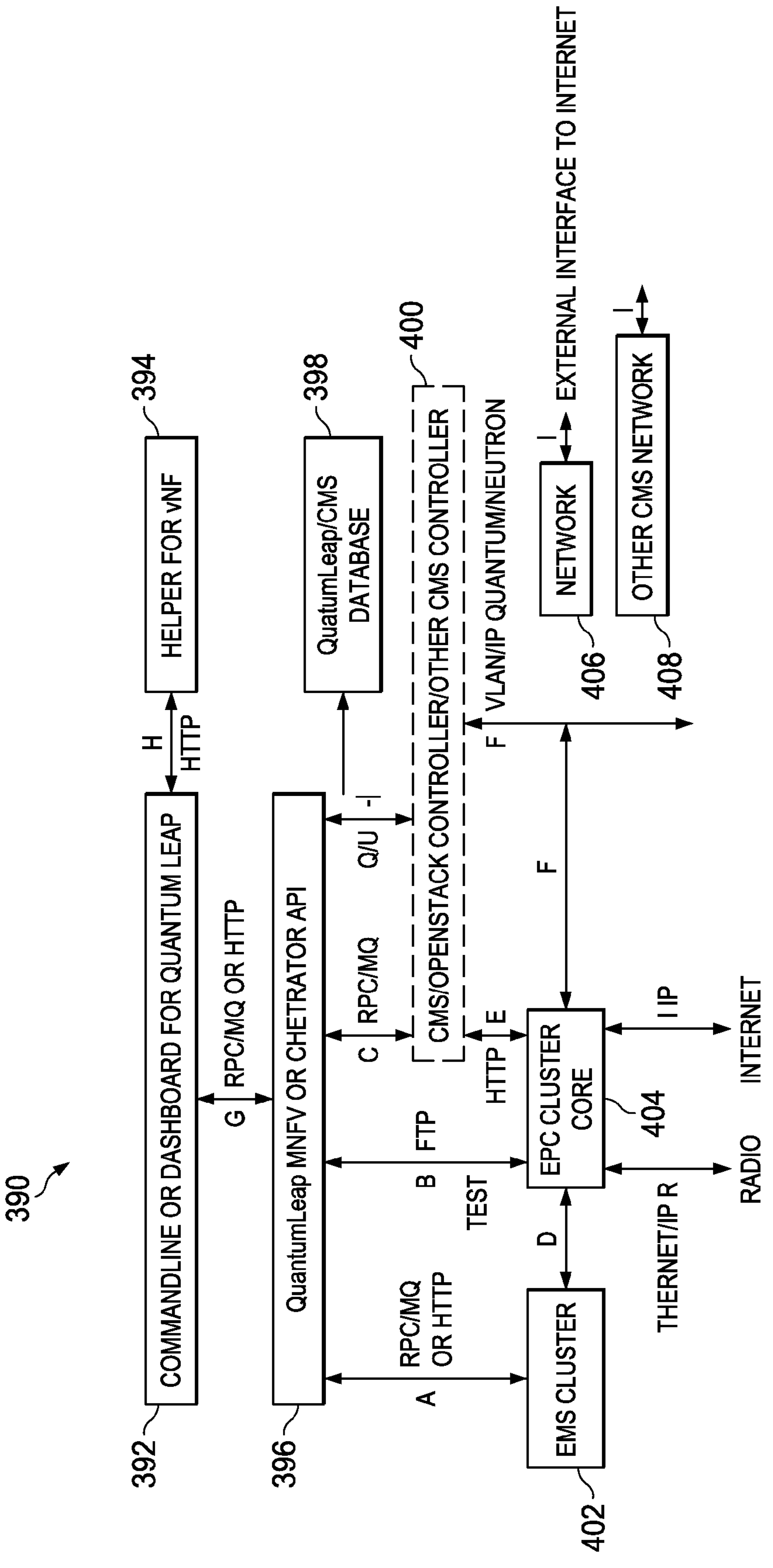
FIG. 12 illustrates another embodiment MNFV system.

FIG. 12 illustrates system 390 for QuantumLeap. QuantumLeap module 396 is the QuantumLeap engine, which processes the QuantumLeap API to perform create, read, update, and delete (provision) commands to EPC cluster 404. The QuantumLeap engine discovers through QuantumLeap database 398, an inventory QuantumLeap database, and associated metadata for existing or new CloudEPC Clusters to identify which interface to be used to orchestrate the infrastructure and its attributes. Metadata known as a virtual cloud EPC cluster descriptor or vC_EPC_D describes one cluster of CloudEPC. CloudEPC includes functions of evolved packer core (EPC) node elements of MME/vMME, SGW/vSGW, and PGW/vPGW. CloudEPC may also include PCRF/vPCRF, HSS/vHSS, and other elements, such as Domain Name System (DNS), DHCP, firewall, and load balancers.

The main MNFV module includes an API engine and an orchestration module, with support both northbound global and local abstract function virtualization for mobile carrier networks or MNOs. The mobile networks are represented by EPC clusters 404.

The EMS clusters 402 may be physical Brownfield carrier EMSs or virtual Cloud EMS clusters which define, build, instantiate, and manage the CloudEPC cluster through its interactions with QuantumLeap module 396. The request from QuantumLeap module 396 may cause southbound APIs to execute. EMS cluster 402 manages CloudEPC functions, such as MME, SGW, PGW, PCRF, HSS, and various mobile operations requested by MNFV, which may be traditional or virtual.

EPC clusters 404 have radio network Ethernet/IP backhaul for control and data planes. Also, EPC cluster 404 supports the applications and/or services on the Internet interface. The MNFV controls the CloudEPC through EMS cluster 402 or CMS 400. The different types of nodes, Compute, Storage, fixed/mobile network slices, and cloud virtual groups are controlled. Testing is performed from QuantumLeap module 396. EPC cluster 404 is a core module which facilitates the mobile network operators offering services in the cloud.

CMS 400, which may be an OpenStack™ controller or another CMS controller, may be independent or integrated with QuantumLeap module 396. Mobile functions are engineered in the EPC Cloud or CloudEPC are done through Hypertext Transfer Protocol (HTTP) to QuantumLeap module 396 or through L3/L2-IP/vLAN layers to EPC clusters 404. Additionally, CMS 400 supports foreign clouds with translation from QuantumLeap API inputs to the corresponding clouds in CMS network 408. Network 406 is also used to communicate with external interfaces to the internet.

Global module 392 interfaces with QuantumLeap module 396 to support Network Operations Support Services (OSS), Business Support Services (BSS), Network Management Systems, such as virtual EMS (vEMS), and other virtual Network File System (vNFS) for building and sustaining CloudEPC.

Helper module 394 interacts with global module 392 via a helper interface. Helper module 394 helps third party vOSS/vBSS/vEMS/vNFS be supported to make the MNFV universal. Helper module 394 for the NMS is a logical software package which may access the northbound API in dashboard 393 and programmatically drive the QuantumLeap API to drive EMS cluster 402, a logical or physical EMS cluster.

Figure 13:
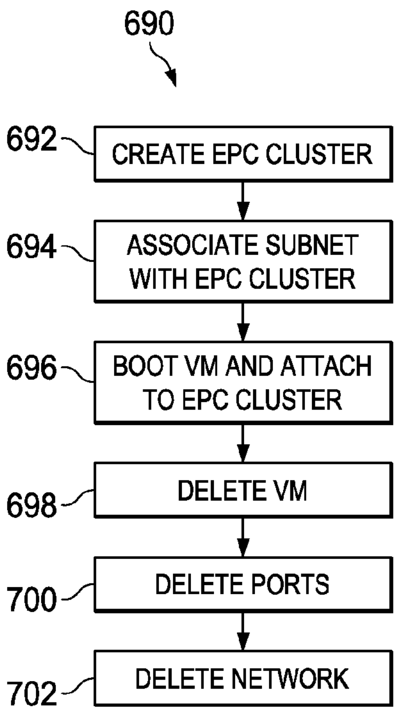
FIG. 13 illustrates a flowchart for an embodiment method of creating an EPC cluster.

FIG. 13 illustrates flowchart 690 for a method of creating an EPC cluster. Initially, in step 692, the tenant creates an EPC cluster. For example, the tenant creates the epc1 EPC cluster with an ID of epc1_id.

Next, in step 694, a subnet is associated with the EPC cluster created in step 692. For example, the tenant associates the 10.0.0.0/24 subnet with the epc1 EPC cluster.

Then, in step 696, a VM is booted and attached to the EPC cluster. The tenant boots a VM and specifies a single network interface controller (NIC) which connects to the EPC. In one embodiment, QuantumLeap contacts OpenStack™ Networking to create the NIC and attach it to the epc1 network with the ID net1_id:

```
$ QuantumLeap boot <server_name> --image <image> --flavor
<flavor> --nic net-id=<epc1_id>.
```

In another example, the port, port1 is created. Then, the VM is booted with a specified port. OpenStack™ Networking creates a NIC and attaches it to the port1 port with the ID port1_id:

```
$ QuantumLeap boot <server_name> --image <image> --flavor
<flavor> --nic port-id=<port1_id>.
```

OpenStack™ networking chooses and assigns an IP address to the port1 port.

In step 698, the tenant deletes the VM. QuantumLeap contacts OpenStack™ Networking and deletes the port1 port. The allocated IP address is returned to the pool of available IP addresses.

Next, in step 700, the ports are deleted. When the tenant had created ports and associated them with the EPC cluster, the tenant deletes those ports.

Finally, in step 702, the network is deleted. The tenant deletes the EPC cluster. An OpenStack QuantumLeap EPC cluster and its associated sublets are deleted when no port is currently configured on the network.

Figure 14:
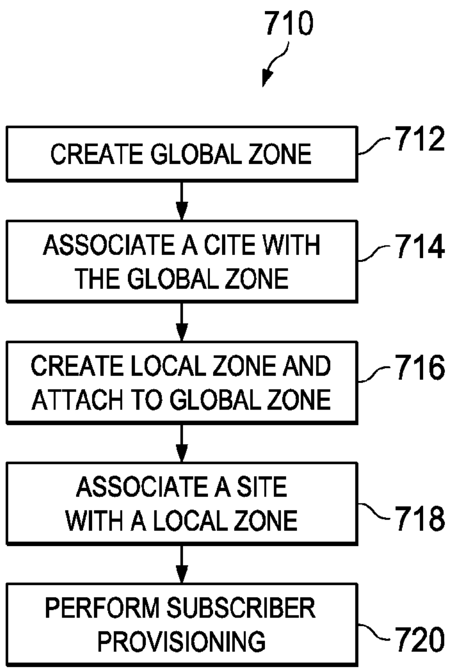
FIG. 14 illustrates a flowchart for an embodiment method of determining geographical zones.

FIG. 14 illustrates flowchart 710 for a method of using a mobile carrier such as an MNO or MVNO. Initially, in step 712, the tenant, an MNO or MVNO, creates a global zone, for example a provider's empty global zone. For example, the tenant creates the North America Zone with an ID of GZone_id.

Then, in step 714, a site is associated with the global zone created in step 712. The tenant associates the site with the global zone. For example, the tenant associates the EPC cluster epc1 with the North America GZone_id.

Next, in step 716, a local zone is created and attached to the global zone. The tenant creates a local zone, for example Provider's empty Local Zone. For example, the tenant creates the Santa Clara zone with a zone ID of LZone_id.

In step 718, a site is associated with the local zone created in step 716. The tenant associates a site with that local zone. For example, the tenant associates the EPC cluster epc2 with the Santa Clara LZone_id.

Finally, in step 720, subscriber provisioning is performed. After the global zones, local zones, and sites are established with respective EPC clusters, provisioning mobile network involves allocating provider pools, resources, attributes, and quotas. Further provisioning subscriber and using provisioned applicable resources, such as APN, may be tested using other API calls with EPC adapter.

An image is the operating system and/or bootable package bundles as a standard software appliance image for creating virtual machines in a standard format. Imagelink is a web uniform resource locator (URL) address of the location of the image, for example http://w.x.y.z/bin/Images/. The descriptor is an XML or JSON formatted object in a hierarchy or relations describing nodes and their interfaces to form a cluster of nodes working together. The destination is the web URL or path to get the descriptor by convention or configuration. GroupType describes closely knit EPCs or RANs for use by different entities. The virtual cloud group (VCG) is a grouping of either EPCs or RANs in a cluster or cloud which may be described as a unit. The APN is an entity which uses VCG with mobile originating (MO), mobile terminating (MT), or a slice of network EPC clusters or RANs. A subscriber (SUB) is assigned a mobile number, for example subscriber identity module (SIM) or universal subscriber identity module (USIM). An entity is any piece of hardware or software which may connect to the network services. Subscriber attributes include International Mobile Equipment ID (IMEI) and International Mobile Subscriber ID (IMSI). Profile types include independent consumer account (INDI) or foundation or corporation account (FAN). The GroupArray is an array with one or more APN or grouping based on provisioning of a mobile device by the carrier or MNO.

The physical asset owners may own and lease assets of different types, such as Spectrum, Compute, Storage, and Network. The network may be an Ethernet network or an isolated virtual layer-2 broadcast domain, for example reserved for the tenant who creates it, or configured to be shared. Tenants may create multiple networks until reaching specified thresholds. The resources may be managed as pools and allocated or de-allocated based on availability and policy assigned for admission controls. The MNO is assigned an ID as in 3GPP using public land mobile network identification (PLMNID). The IDs may be assigned in a different manner for private or unlicensed spectrums. After the MNO is established as a Project/Tenant, for example under OpenStack™ or another cloud management system, the shared resources in the Radio Access Node or Core Network are allocated to Mobile Virtual Network Operators (MVNOs). The MVNOs are established by MNO or the Service Provider from their network. Thus, a Provider Network may be equivalent to the MNO's resources, which include an EPC Cluster with CMS/EMS for managing elements within the core network. Billing and other northbound helper functions are at a global level to manage operations.

The physical asset owners own and lease different asset types, such as Spectrum, Compute, Storage, and Network. The resources may be managed as pools and allocated or de-allocated based on availability and policy assigned for admission controls. The MNO is assigned an ID as in 3GPP, for example using PLMNID to keep conformance with telecommunications standards. An ID may be used differently for private or unlicensed spectrum. When the MNO is established as a project/tenant under a CMS, the shared resources in the radio access network or core network may be allocated to MVNOs. MVNOs are in a term established by the MNO or service provider from their network. Thus, a provider network is a term for the MNO's resources, which include the EPC cluster and EMS cluster for managing elements within the core network. Because it manages operations, billing the other northbound helper functions is at a global level.

Thus, besides the resource pools, before establishing the MNO/MVNO, the geography is defined via descriptors in an XML hierarchy or JSON descriptors. There is a mapping to minimize configurations in the geolocation object. This is flexible to accommodate mappings in the data center (DC) and carrier node identified in the virtual circuit path from the core towards the edges.

The geography is defined via descriptors in XML or JSON before establishing the MNO/MVNO. This may be done in open source or OpenStack™ programming. There is flexibility to accommodate mappings in data centers and carrier node identification in virtual circuit path design from the core towards the edges to meet dimensioning requirements for traffic pipe management.

When a geolocation is established in the descriptor, the node is instantiated using virtual network function (VNF)

node elements like CloudEPC in virtual domains, or additional programs or packages. Objects have a manager. Legacy EPC is managed by legacy EMS, and a newer CloudEPC is managed by legacy EMS or a new cloud created by vEMS. Many objects may be manageable through QuantumLeap, which may orchestrate the programs and functions through cloud management system and traditional EMS.

Once the network clusters are ready to be managed, a user may connect and use the sessions by subscribing and using LTE based networks. Alternatively, network clusters may be managed through the internet as the MNO or MVNO establishes their network by convention and configuration through Access Control List (ACL), policy for network resource usage through VCG, or rules which permit or restrain the use of certain resources and groups through a combination of ACL and policies.

When the network clusters are ready to be managed, a user may connect and use the sessions by subscribing and using an LTE based network. Alternatively, the user connects through the internet as the MNO or MVNO to establish networks by convention and configuration.

In an example, a tenant creates an EPC cluster, for example epc1. Then, the tenant associates a subnet with that EPC cluster, for example "10.0.0.0/24." The tenant then boots a VNF with between three and five node EPCs, and specifies subnets connected to epc-net1. A VM is a completely isolated guest operating system installation within a normal host operating system. A module, for example QuantumLeap, invokes Nova and/or Neutron, and creates the topology based on epc.xml or vnf.xml, epc.json, or vnf.json descriptors. Neutron assigns the subnets and internet protocols (IPs) as requested, or defined in the XML/JSON descriptors of VNFs. A virtual application function (vApp) is a server side application or service run indirectly IP multimedia subsystem (IMS) application functions (AF) or directly over a 3GPP G-Interface/Secured (Gi/SGi) or Internet interface. The IP is provided by QuantumLeap. The tenant then deletes the VM. Nova contacts QuantumLeap to Neutron and removes epc-net1. The allocated IP address is returned to the pool of available IP addresses.

IP addresses are allocated. EPC networks may use IP version 4 (IPv4) or IP version 6 (IPv6) address blocks. An embodiment QuantumLeam network may have a minimum of three nodes, including MME, SGW, and PGW and additional nodes, such as PCRF, HSS, other vNFs etc. When a port is created on the network, by default it is allocated an available fixed IP address of the designated subnets for the IP version. When the port is no longer used the allocated addresses return to the pool of available IP addresses on the subnets. Users of a QuantumLeap API may choose a specific IP address from the block. Alternatively, QuantumLeap configuration xml/json files of nodes called node descriptors choose the first available IP address.

Figure 15:
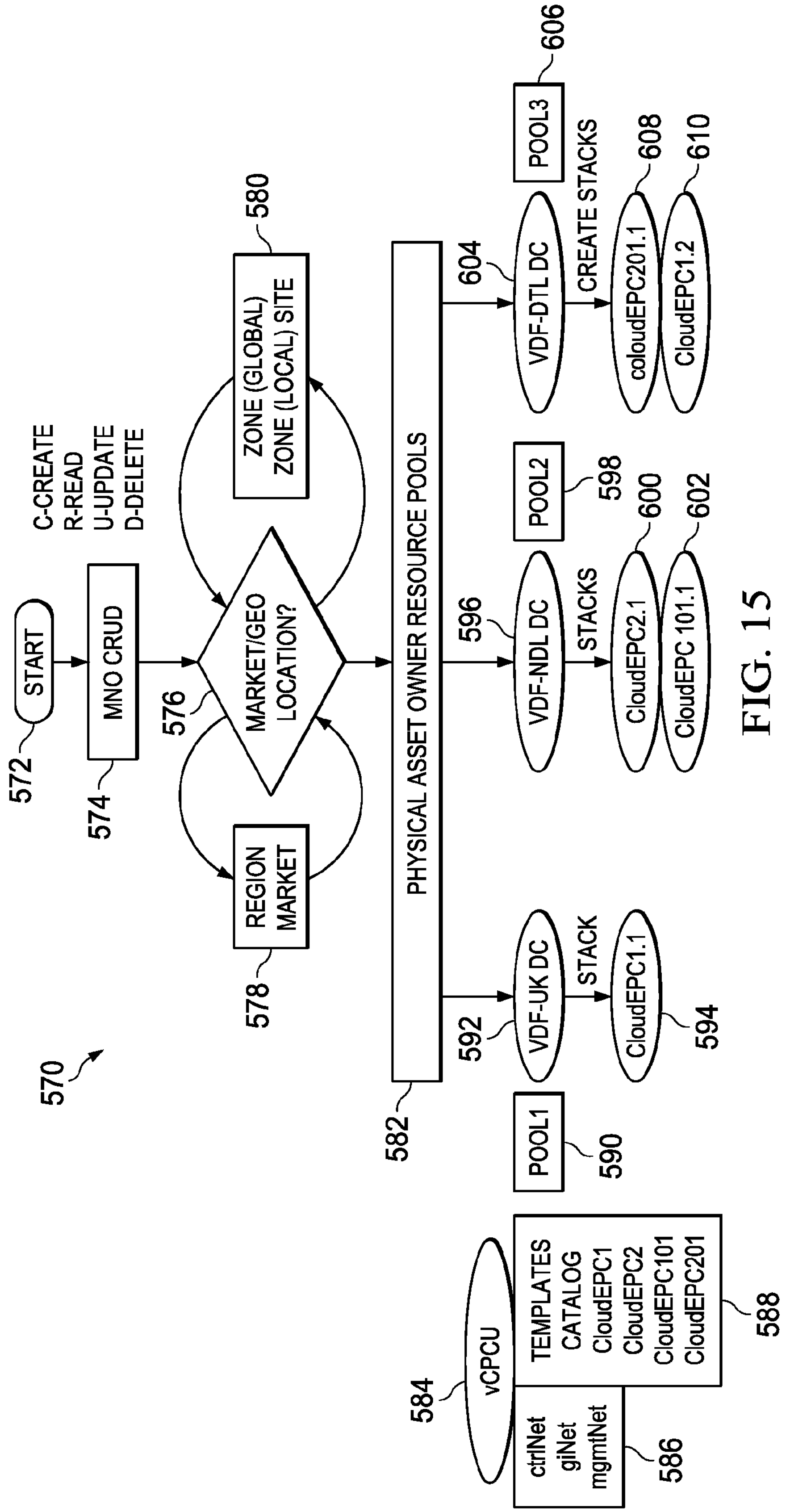
FIG. 15 illustrates a flowchart for an embodiment method of mobile network modeling and orchestration.

FIG. 15 illustrates flowchart 570 for a method of mobile network modeling and orchestration. Starting with flow in 572, the system start from creating an MNO.

In step 574, MNO CRUD is performed.

Then, in step 576, the market or geolocation is determined. In step 578, the region is determined. Also, in step 580, the zone and site are determined. Additionally, the DC, cluster, and node are performed to determine the geolocation.

Next, in step 582, the physical asset owner resource pools are determined. The mobile node pools, mobile node clusters, and physical asset owners are determined. Traffic offloads to public clouds is built in to the node modeling.

Pool 590 with Vodafone™ United Kingdom (VDF-UK) DC 592 accesses CloudEPC 594. Also, pool 598 with Vodafone™ VDF-NDL DC 596 accesses CloudEPC 600 and CloudEPC 602. Additionally, pool 606 with VDF-DTL DC 604 accesses CloudEPC 608 and CloudEPC 610. Virtual Capacity Planning Catalog Units (vCPCU) 584 contains templates 588 and networks 586.

Figure 16:
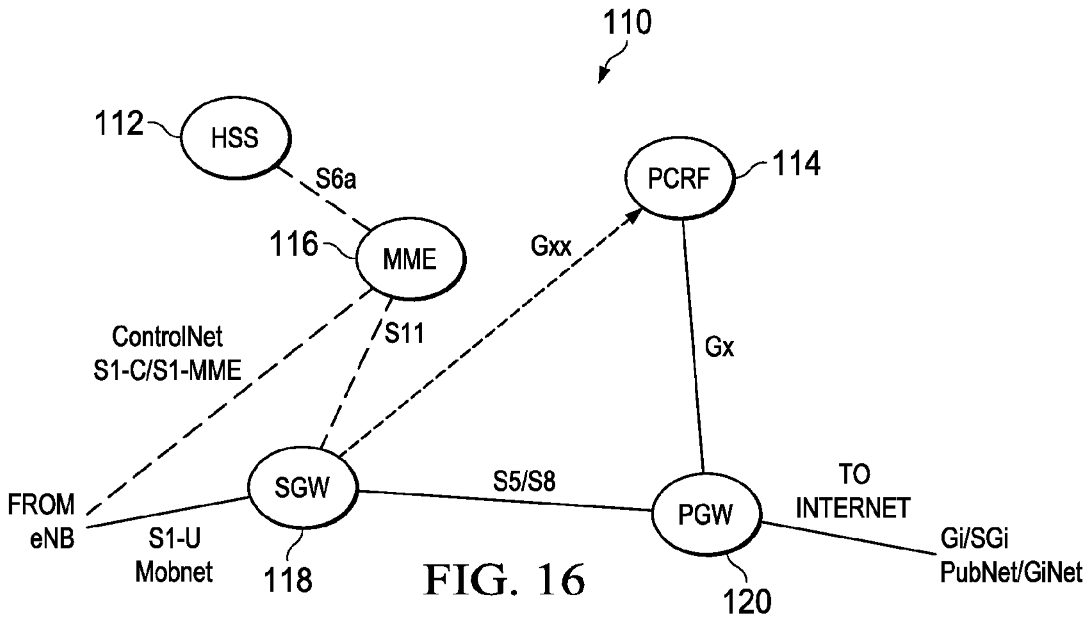
FIG. 16 illustrates an embodiment node topology.

FIG. 16 illustrates topology 110 with five nodes. An eNB is connected to MME 116 and SGW 118. MME is connected to HSS 112. SGW 118 is connected to PGW 120 and PCRF 114, while PGW 120 is connected to PCRF 114. PGW 120 is connected to the Internet. Orchestration between MME 116 and SGW 118 is performed using a QuantumLeap API. Orchestration includes internal and external orchestration.

Another embodiment is a three node topology containing MME 116, SGW 118, and PGW 120.

Figure 17:
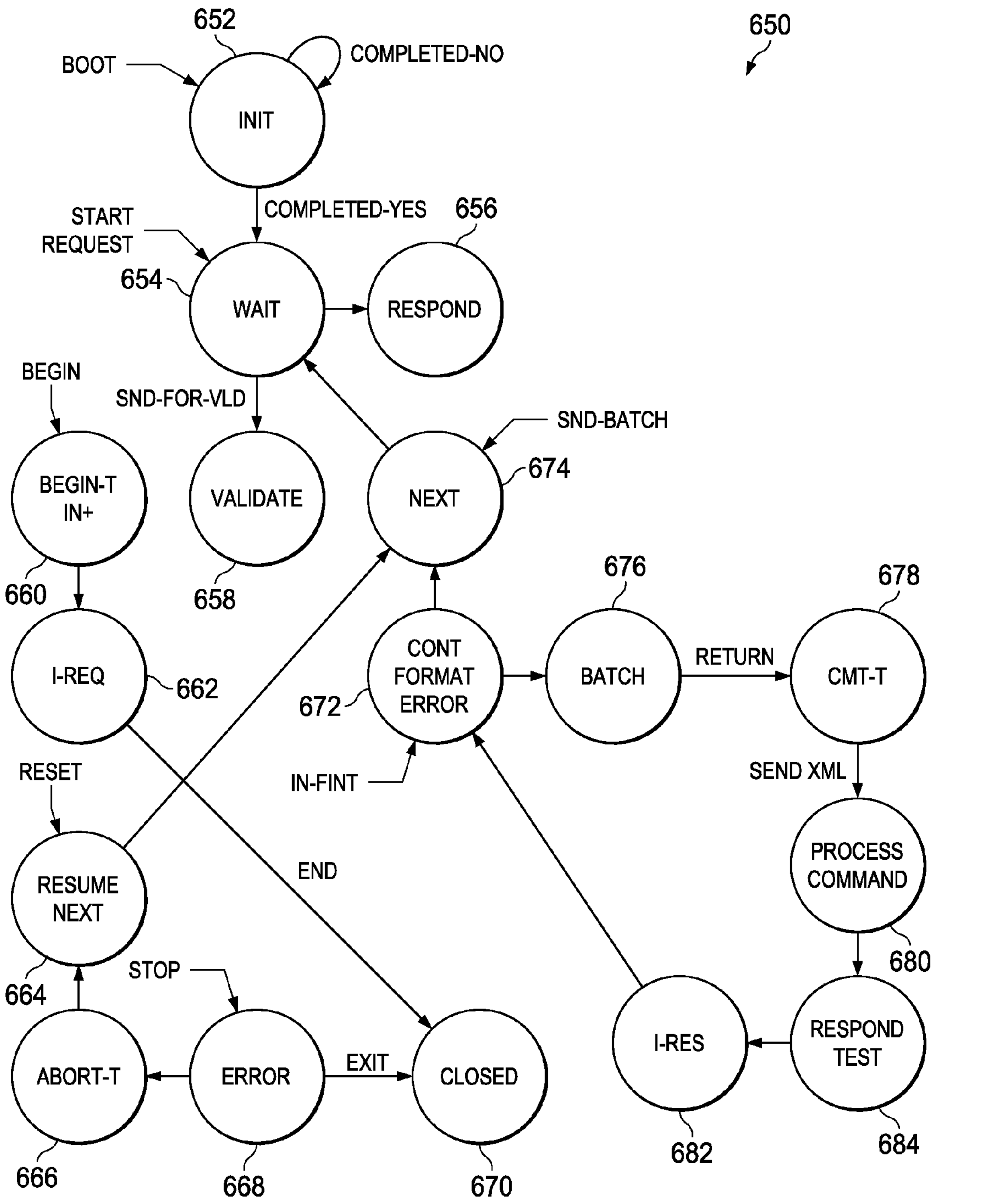
FIG. 17 illustrates an embodiment state machine for creating an EPC.

FIG. 17 illustrates state machine 650 for EPC create with JSON requests and response. The state machine goes from start request to response for an EPC cluster. Initially, upon boot, the state machine is in initiation (init) state 652. The state machine remains in initiation state 652 until initiation is completed. When initiation is completed, the state machine proceeds to wait state 654.

In wait state 654, the state machine waits for a start response. The state machine then responds in respond state 656. Also, the state machine proceeds to stage 658 to begin validation.

Next, the state machine proceeds to state 660 to begin transaction Tin+.

Then, the state machine proceeds to state 662 for I-Req In-Fmt.

The state machine goes to state 672 for a format error or to state 670 closed. From state 672, the state machine may proceed to state 668, state 674, or state 676.

In state 668, a reset error is performed. The state machine proceeds to state 670, state 666 to abort, or state 664 to resume the next operation.

In state 674, the state machine goes to the next operation, and proceeds to wait state 654.

In state 676, a batch is sent.

Then, in state 678, commit Cmt-T is performed. XML is sent, and in state 680, the command is processed.

In state 684, a test response is performed.

Next, in state 682, response I-Res is performed. The state machine proceeds to state 672.

Figure 18:
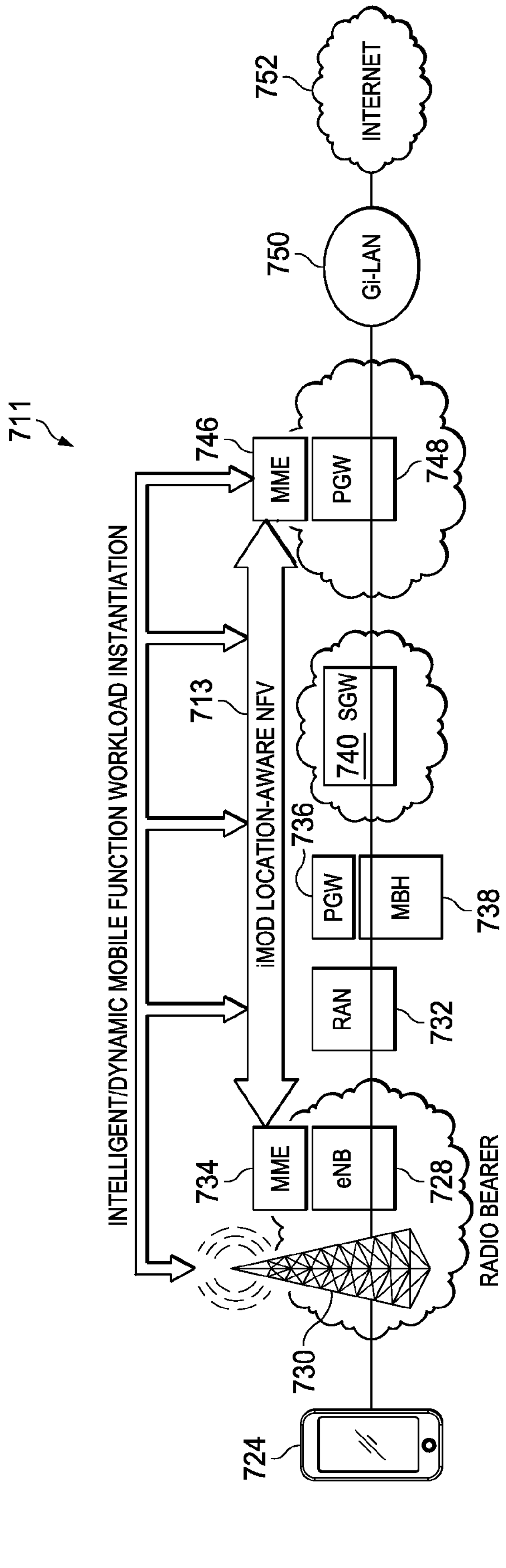
FIG. 18 illustrates another system for MNFV.

FIG. 18 illustrates system 711 for intelligent, location aware network function virtualization. The NFV performs NW function cataloging, network asset auto-discovery, distributed NFV instantiation, and flexible operations mode. Portfolio differentiation may be performed. NFV 713, an iMOD location aware NFV, performs intelligent and dynamic mobile function workload instantiation. SGW, PGW, and MME are used.

UE 724 is coupled to eNB 728 with radio bearer 730. Also, eNB 728 is controlled by MME 734. Wireless signals propagate between UE 724 and eNB 728. eNB is coupled to RAN 732. RAN 732 is coupled to MBH 738 in PGW 736, SGW 740, and PGW, which is controlled by MME 746.

RAN 732 is coupled to MBH 738, which is controlled by PGW 736.

PGW 748 is coupled to Gi-LAN 750, which is coupled to internet 752.

Figure 19:
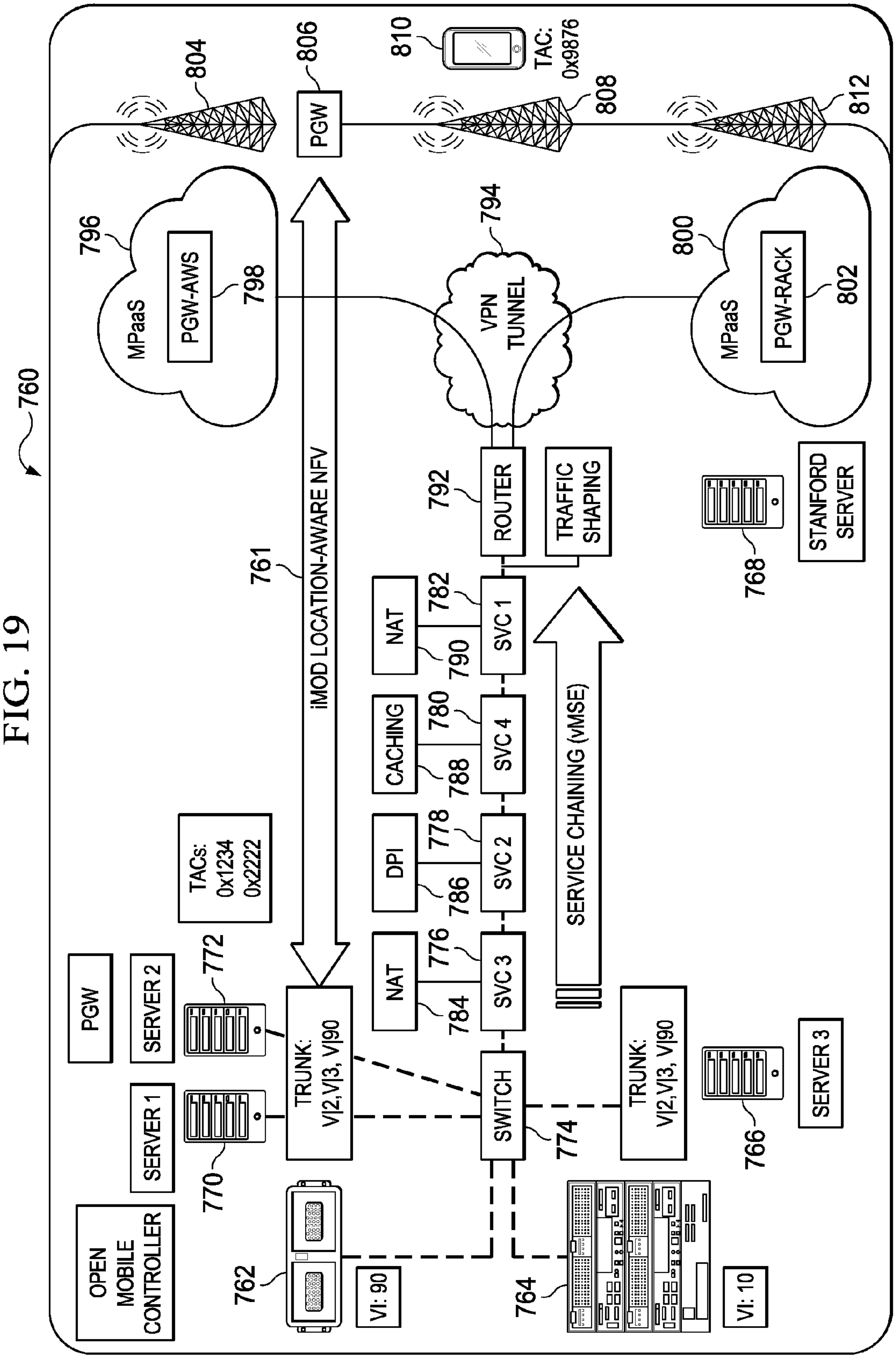
FIG. 19 illustrates an additional system for MNFV.

FIG. 19 illustrates system 760 for mobile network function virtualization. System 760 may use OpenStack™. Controller 762, an open mobile controller, controls switch 774.

Switch 774 is coupled to server 770, server 772, Ixia™ 764, and server 766. Server 766 runs OpenStack™, while server 772 operates as the PGW.

NFV 761 is an iMOD location aware NFV. Service chaining, or vMSE, is provided by SVC 776, SVC 778, SVC 780, and SVC 782. The SVCs transport data so it appears as though there is a dedicated physical layer link between the source and destination end systems.

SVC 776 is coupled to network address translation (NAT) 784. SVC 778 is coupled to deep packet inspection (DPI) module 786. SVC 780 is coupled to caching device 788. Also, SVC 782 is coupled to NAT 790. DPI module 786 examines the data part of a packet, searching for protocol non-compliance, viruses, spam, intrusions, etc., to determine whether the packet may pass on to its destination. In NAT, network addresses are modified for remapping one IP address space into another.

Router 792 is used for traffic shaping.

Traffic is passed through VPN tunnels 794 to MPaaS 796 and MPaaS 800 with server 768. MPaaS 796, which contains PWG-AWS 798, passes traffic to eNB 804, while MPaaS 800, which contains PGW-RACK 802, passes traffic to eNB 812.

Traffic may then be directed towards eNB 808, UE 810, and PGW 806.

In one example, a tier 1 carrier is used. The carrier owns three data centers (DC0, DC1, and DC2). Carrier branches, Branch1 and Branch2 operate their own packet cores by using local data centers while working with the headquarters. Thus, there are nested MNOs based on geolocation (GeoLoc). MY-MNO is global with a CMS of OpenStack™, and MY-MNO1 France Local and MY-MNO2 Scott local. MY-MNO owns and operates the EPC network (EPC-NET) cluster with the APN-UK and assigns APN-France (APN-FR) and APN Santa Clara (APN-SC) for use by MY-MNO1 and MY-MNO2 as assigned by the admin (UK) tenant or by MY-MNO on the OpenStack™ using a QuantumLeap horizon dashboard panel. There may be only one OpenStack™ controller at the UK site. Alternatively, there is a separate OpenStack™ Controller at the different sites.

Initially, the PAO, for example MY-MNO, organizes its data center resources (servers, storages, and switches) into a Zone/Site/DC/Portable on Demand units (POD)/Cluster/Rack/Node hierarchy.

The PAO runs a CMS, OpenStack™, on no-virtualized servers. The other computing resources run hypervisors, for example kernel based virtual machine (KVM). The PAO uses the CMS to pool or allocate resources. The CMS and the nodes may be using a dedicated management network to communicate. The PAO runs QuantumLeap (QM). OpenStack™ is used as the CMS. QL, along with other modules, provides MNFV services.

GeoLocation mapping is performed. The PAO queries the pool of available resources using QL and categorizes these resources into a Zone/Site/DC/POD/Cluster/Rack/Node hierarchy. QL uses OpenStack™ to query the resources. QL internally stores the node—geolocation mapping. In one example three DCs are used. The three DCs are in UK, France, and Santa Clara. The UK DC is global, while the other two are local. Table 2 below illustrates the classifications for the 3 DCs.

TABLE 2

| Zone | Site | DC | Cluster | Tenant | APN | VLAN | Subnet |
|---|---|---|---|---|---|---|---|
| UK | London | UK1 | Epc-uk1 | MY-MNO | APN-UK | 10/11 | 10/11 |
| FR | Paris | FR1 | Epc-fr1 | MY-MNO1 | APN-FR | 100/101 | 100/101 |
| SC | Dublin | SC1 | Epc-sc1 | MY-MNO2 | APN-SC | 200/201 | 200/201 |

The MNO is created. Because each MNO owns a packet core network, they rely on the global core for global templates. The global templates are modified for local use. For example, Pound is changed to Frank, time zones are made local, and QuantumLeap instantiates these descriptors for local use with global roaming across the three network data centers. The VLAN is assigned an odd/even pair for transmit and receive channels.

A subscriber may be created or simulated using CloudEPC SGW sessions. The subscriber sessions emanating from eNodeB may create sessions on MY-MNO1, MY-MNO2, or MY-MNO using QL support subscriber (SUB) API and session APIs.

In another embodiment, only one of the operators, MY-MNO owns spectrum and MME resources. Two MVNOs, MY-MVNO1 and MY-MVNO2 own other resources. Table 3 below illustrates the parameters. The operations of MME is with ClearWire™, as P-MAO in MY-MNO and the virtual instance assigned to Sprint and Leap, respectively, in MY-MVNO1 and MY-MVNO2. Also, the APNs are based on the EPC used, because each entity owns at least one EPC cluster within their DC.

TABLE 3

| Zone | Site | DC | Cluster | Tenant | APN | VLAN | Subnet |
|---|---|---|---|---|---|---|---|
| CW | C1 US | C1 | Epc-cw1 | MY-MNO | APN-CW | 10/11 | 10/11 |
| SP | S1 US | S1 | Epc-sp1 | MY-MNO1 | APN-SP | 100/101 | 100/101 |
| LP | L1 US | L1 | Epc-lp1 | MY-MNO2 | APN-LP | 200/201 | 200/201 |

In the initial setup, a PAO, MY-MNO, organizes its data center resources (servers, storages, switches) into a Zone/Site/DC/POD/Cluster/Rack/Node hierarchy. The PAO runs CMS on non-virtualized servers. The other compute resources run on hypervisors, such as KVM. The PAO uses CMS to pool resources. CMS and the nodes are using a dedicated management network to communicate. The PAO runs QuantumLeap. The CMS is OpenStack™. QL and other OpenStack™ modules provide MNFV services. This is repeated for MY-MNO, MY-MVNO1, and MY-MVN2 tenants by PAO, which are handed over to the tenants.

The tenant MY-MNO now has radio resources spread across all three sites, C1, S1, L1. MY-MNO decides to create APNs for each site separately and hand APN-SP and APN-LP to MY-MVNO1 and MY-MVNO2, respectively. MY-MVNO retains APN-CW for its own use.

MY-MNO now adds:

```
QuantumLeap>>> Create APN APN-CW GroupType(EPC)
GroupArray(epc-cw1) Descriptor epc-cw.xml Destination{subnet 10
or vlan10}
>>>> CreateAndAssingn MNO id 'MY-MNO' ZONE 'CW,G' Site 'C1'
DC 'C1' APN APN-CW
```

-continued

```
...Success assigned vlan 10/11 to MNO_ID '1111-1111-1111-1111' MY-
MNO CW/C1/C1/epc-cw1
```

Then, Clearwire Assigns V-MAOs to Sprint and Leap for RAN sharing MVNO use. This is done by:

```
QuantumLeap>>> Create APN APN-SP GroupType(EPC) GroupArray
(epc-sp) Descriptor epc-sp.xml Destination{subnet 100 or vlan100}
>>>> CreateAndAssingn MVNO id 'MY-MVNO' ZONE 'SP,G' Site
'S1' DC 'S1' APN APN-SP
...Success assigned vlan 100/101 MVNO_ID '2222-2222-2222-2222'
MY-MVNO1 SP/S1/S1/epc-sp1
QuantumLeap>>> Create APN APN-LP GroupType(EPC) GroupArray
(epc-lp) Descriptor epc-lp.xml Destination{subnet 200 or vlan200}
>>>> CreateAndAssingn MVNO id 'MY-MVNO2' ZONE 'LP,G' Site
'L1' DC 'L1' APN APN-LP
...Success assigned vlan 200/201 MVNO_ID '3333-3333-3333-3333'
MY-MNO2 LP/L1/L1/epc-lp1
```

In an additional embodiment, a tier-1 carrier runs its operations on a third party service provider infrastructure. A tier-1 carrier owns the SGW and PGW hardware and the spectrum to operate at a Zone/Site/DC/cluster. However, the MPaaS software of CloudEPC and hardware are owned by a third party, which is a PAO. An MNO is created and assigned a VDF spectrum via:

```
quantumleap>>> Create MNO id null name MY-MNO PLMNID 224
Frequency 800 MHz Band L epc=null
success ...id=224 epc=null
```

The tenant MY-MVNO can create an instance of MPaaS as a virtual context for VDF to use in Shanghai, Pudong local area in south China Zone. This is done by:

```
QuantumLeap>>> Create APN APN-VDFHW GroupType(EPC)
GroupArray(epc-hw1) Descriptor epc-hw.xml Destination{subnet 10 or
vlan10}
>>>> CreateAndAssingn MNO id 'MY-MNO' ZONE 'HW,G' Site 'S1'
DC 'PD1' APN APN-VDFHW
...Success assigned vlan 10/11 to MNO_ID '1111-1111-1111-1111' MY-
MNO HW/S1/PD1/epc-hw1
>>>> CreateAndAssingn MVNO id 'MY-MPaaS' ZONE 'SouthChina,
G' Site 'S1' DC PD1' APN APN-VDF
...Success assigned vlan 100/101 MPaaS_ID '2222-2222-2222-2222'
MY-MPaaS
SouthChina/S1/PD1/epc-vdf1
```

A subscriber may be created or simulated using a traffic generator tool or CloudEPC SGW sessions to demonstrate that subscriber sessions emanating from eNodeB can create sessions on MNO or MPaaS using QL SUB API and session APIs.

In another embodiment, an entire APN is owned by a single subscriber who obtains network resources from MY-MNO as needed. In the initial setup, a PAO, MY-MNO, organizes its data center resources (servers, storages, switches) into a Zone/Site/DC/POD/Cluster/Rack/Node hierarchy. The PAO runs the CMS on non-virtualized servers. The other compute resources are running hypervisors, such as KVM. The PAO uses CMS to pool resources. The CMS and nodes are using a dedicated management network to communicate. The PAO runs QL. The CMS is OpenStack™. QL, with other OpenStack™ modules, provides MNFV services. When both the core EPC cluster and radio node path is established by MY-MNO, its subscriber obtains its MPaaS. MY-MNO now adds:

```
QuantumLeap>>> Create APN APN-100 GroupType(RAN,EPC)
GroupArray(RAN1,epc-net1)
Descriptor epc.xml Destination{subnet 100 or vlan100}
>>>> CreateAndAssingn MVNO VMNO1 APN APN-100
...Success
QuantumLeap>>> Create APN APN-200 GroupType(RAN,EPC)
GroupArray(RAN2,epc-net2)
Descriptor epc.xml Destination{subnet 200 or vlan200}
>>>> CreateAndAssingn MVNO VMNO2 APN APN-200
...Success
```

A subscriber may be created or simulated using a traffic generator tool or a UE with VMNO1 sessions on VMNO1, VMNO2, or MY-MNO using QL SUB API and session APIs.

Request and response types may be supported in the JSON data format. The format for request and response types may be specified using the Accept header or adding a .son extension to the request URL. An example request is given by:

```
POST /v1.0/tenants/tenant/networks HTTP/1.1
Host 127.0.0.1:9696
Content-Type application/json
Accept application/json
Content-Length 57
{
  "epc-network":
        {
                "name": "epc1-net",
                "admin_state_up": true
        }
}
```

There may be synchronous and asynchronous plug-ins. A logical model of mobile network connectively with mobile network clusters, nodes, ports, and subnets is in the QuantumLeap API. The plug-ins communicate with the Neutron and/or the underlying infrastructure directly to facilitate packet forwarding being consistent with the logical model. A plug-in may perform these operations asynchronously, so when an API client modifies the logical model using HTTP POST, PUT, or DELETE, the API call may return prior to the plug-in performing modifications to the underlying virtual and/or physical switching devices.

Subsequent API calls properly reflect the changed logical model. In one example, a client uses an HTTP PUT to set the attachment for a port. A port is a virtual switch port on a logical network switch. Virtual instances attach their interfaces into ports. The logical port also defines the media access controller (MAC) address and IP addresses to be assigned to their plugged in interfaces. When IP addresses are associated to a port, the port is associated with a subnet, because the IP address was taken from the allocated pool for a specific subnet. A subnet is an IP address block which may be used to assign IP addresses to virtual instances. The subnets may have Classless Inter-Domain Routings (CIDRs) which are associated with a network. IP addresses may be selected from the whole subnet CIDR or from allocation polls which may be specified by the user. There is no guarantee that packets sent by the interface named in the attachment will be forwarded immediately once the HTTP calls return. However, there is a guarantee that a subsequent HTTP GET to view the attachment on the port would return the new attachment value. The "status" attribute, available for EPC cluster/network and port resources, may be used to understand whether the QuantumLeap plug-in has successfully completed the configuration of the interested resource.

In an embodiment QuantumLeap API, several objects of the same type may be created in the same API request. Bulk create operations use the same API as singleton create operation, where a list of objects, rather than a single object, is specified in the request body. Bulk operations are performed atomically, meaning that either all or none of the objects in the request body are created. The state machine for QuantumLeap engine using transaction commits is used for atomicity. When a plug-in does not support atomic operations, the QuantumLeap engine emulates the atomic behavior. For example, a tenant requests a five node EPC cluster, and the third node fails at creation time. Although a specific vendor plug-in does not support the transaction aborting upon this failure, the QuantumLeap state machine does not create the mess cluster, and cleans up all five nodes.

In another embodiment, QuantumLeap is used without support for bulk operations. A 400 Bad request error may be returned when the client attempts a bulk create operation.

Bulk Commit is an operation where combined APIs may be committed for bulk creates and/or updates. A state machine built-in engine supporting automation.

Table 4 below lists combinations of topology which may be used as descriptors, for example pgw.xml, a combination of pgw.xml and sgw.xml, or the three minimum of mme.xml, sgw.xml, and pgw.xml. Descriptors are XML or JSON formatted objects in a hierarchy describing nodes and their interfaces to form a cluster of nodes working together. CRUD are basic functions of persistent storage in computer programming. CRUD(L, S)X is a standard REST call as SQL type calls create, read, update, delete (list, show) in an API. X is for execute or run for program objects.

TABLE 4

| Function | Description | Ingress Port | Egress Port | Comments |
|---|---|---|---|---|
| MME | Manage Mobility Function @CP Router/GTP-C | Admit, Update, Delete UE/NW - NAS requests | Accept/Reject NAS - request | QL supports XML descriptor mme.xml/JSON |
| SGW | Serving Gateway - DNS for DP Tunnels | Anchor Point for user/network I/F | IP traffic to/from S5/S8 Interface | QL supports XML descriptor sgw.xml/JSON |
| PGW | Packet Gateway - IP Allocation/Prefix | Create & use DP GTP-U tunnels | IP traffic from/to PDN/Internet | QL supports XML descriptor pgw.xml/JSON |
| HSS | Home Subscriber Service for Subscriber (SPDB) | CRUD Request for Sub Profile/Access Request | Sub-Profile Allow/Block | QL supports XML descriptor hss.xml/JSON |
| PCRF | Packet Charging Rules Function | Register node for Usage-Policy/ Billing | Provide Usage through Ceilometer for node | QL supports XML descriptor pcrf.xml/JSON |
| VNF | Virtual Network Function | A custom virtualized Network Function (e.g. Firewall, Load) | Provide usage based on defined virtual network | QL supports XML/JSON descriptor |

An EPC cluster may use MNO or MVNO contexts together with zones, sites, and data centers before being consumed by subscribers. Table 5 bellow lists some QuantumLeap building blocks for hierarchical instantiation and consumption of data services by the subscriber using motile network access.

TABLE 5

| Task | API Objects | General Availability of CRUD(L, S)X |
|---|---|---|
| Provisioning Infrastructure (using OpenStack ™ Cloud QuantumLeap/Nova/Neutron) | PAO, MAO, MNO, MVNO, Resource, Pool, CloudEPC, VM | xxxx(x, x)x |
| Provisioning Mobile Network Functions (using QuantumLeap OpenStack ™ module) and Provider aspects | <GeoLoc> = (Zone, Site, DC, Cluster, Node, Server), APN, VCG, VNF (vSGW, vPGW, vMME), Policy, Rules, Monitor, Notify, Profile | xxxx(x, x)x |
| Provisioning Subscribers & Allocating Resources | SUB, Profile, ACL | xxxx(x, x)x |
| Using Provisioned Resource | Session, Tunnel, Test | xxxx(x, x)x |
| Service cataloguing, chaining, and orchestration | Catalog, MpaaS, MbaaS, Open Mobile API service chaining manager (SCM) | xxxx(x, x)x |

Table 6 below shows API objects and functions for Mobile Carrier Network Operations for Cloud automation and migration. <GeoLoc> is a possibly recursive hierarchical object selected from zone, site, DC, cluster, node, and server. Server is a physical or hypervisor level, possibly a VM. The function name is one of Provision, Program, Decommission, Status and Ignore. VNF is one or more of vEMS, vMME, vSGW, vPGW, vPCRF, vHSS, virtual eNB (veNB), virtual Nano (vNano), vIMS, virtual Open Computer and Software (vOCS), VNF, and virtual AF (vAF). The program is one or a combination of operating system (OS), package, component, connection, interface, and links. Operation is one or a combination of Session, DefBearer, GBR, QoS, DRB, SRG, Tunnel, GTP, Generic Routing Encapsulation (GRE), Alloc, and Dealloc. A profile may be for an INDI subscriber, a FAN for a corporation or organization with several virtual cloud groups (VCGs) and tied to APN(s). A VCG is a grouping of either EPCs or RANs in a cluster or cloud, which may be described as a unit. Descriptors may use policy, subscriber profiles, access control lists, and other available means in the API to define options for MNO/MVNO to manage the networks in the radio, cover, or a combination using rules. Similarly, some individual or groups of objects may be monitored for active or inactive status and/or protocol. The object notifies it in response to set points established for notifying the trigger in the descriptors.

The architecture of an embodiment MNFV is modular to support flexible, adaptable, and extensible APIs through open source, Linux®, and OpenStack™ platforms for virtualization and virtualization features, such as KVM/Linux Containers (LXC) and multi-tenancy for MNO through OpenStack™ CMS.

Embodiment QuantumLeap APIs support orchestration of Cloud EPC and EMS clusters, which institute the mobile network operator's core network. The QuantumLeap API has an open subset applicable to mobile carrier network vendors, with the assistance of plug-ins.

Also, interfaces to south bound network infrastructure nodes in EMS and EPC clouds may support third party vendors. The interface between QuantumLeap module 396 and CMS 400 may be used as a broker for other clouds for managing a CloudEPC infrastructure for MNOs and their associated MVNOs.

An embodiment global module uses the geographical partitioning of the network and its slices based on logical nested entities, such as Zone, Sites, Data Centers, Clusters, and Nodes, which may be applied based on templates supported via EMS modules for bulk creation and instant ions for network provisioning.

Because the MNFV architecture is radio neutral, it may be applied to different radio management systems, including small cell, UMTS, LTE, Advanced LTE, with Ethernet, or IP traffic for supporting QoS and differentiated services.

TABLE 6

| Object | Manager Cloud/ EMS | CRUD (L, S)X | Attribute 0 | Attribute 1 | Attribute 2 | Attribute 3 | Attribute 4 | Attribute 5 | Attribute 6 |
|---|---|---|---|---|---|---|---|---|---|
| PAO | E | XXXX (X, X) | Id | Name | AssetOwner | AssetType Array[] | Database[] | Connection [] | Connection[] |
| Pool | C/E | XXXX (X, X) | Id | Name | AssetType | Unit | Count | AllocList[] | FreeList[] |
| MNO/MAO | E | XXXX (X, X) | Id | Name | PLMNID | Frequency | Band | License | EPC |
| CloudEPC | C + E | XXXX (X, X)X | Id | Name | Image | Imagelink | Descriptor | Descriptor link | Destination |
| EPC | E | XX (X, X)X | Id | Name | Descriptor | Descriptor link | Description | | |
| VCG | C + E | XXXX (X, X) | Id | Name | GroupType (EPC/RAN) | GroupID | GroupArray [] | Descriptor link | Destination |
| APN | C + E | XXXX (X, X) | Id | Name | GroupType (MO, MT, EPC, RAN) | GroupID | GroupArray [] | Descriptor link | Destination |
| SUB | C + E | XXX (X, X) | Id | Name | Number | IMEI | IMSI | GroupType (INDI/FAN) | GroupArray [APN, . . . ] |
| <GeoLoc> | C + E | XXXX (X, X) | Id | Name | Previous <GeoLoc> | Next <GeoLoc> | Descriptor | Descriptor Link | MonitorType (on/off) |
| <GeoLoc> | C + E | XXXX (X, X) | Id | Name | Node | Monitor (Y/N) | Monitor Type (on/off) | Monitor Protocol[] | MonitorLink[] |
| VNF | C + E | XXXX (X, X)X | Id | Function-name | Image | ImageLink | Descriptor | Descriptor Link | Destination |
| Operation | C + E | XXXX (X, X)X | Id | Name | SUB | Profile Name | ProfilerLink | MaxUnits[] | ActiveUnits[] |
| Profile | C + E | XXXX (X, X)X | Id | Name | ProfileType (INDI/FAN) | ID | ProfileArray [] | Descriptor link | Destination |
| ACL | C + E | XXXX (X, X)X | Id | Name | GroupType (EPC+/RAN) | GroupID | GroupArray [] | Descriptor link | Destination |
| Policy | C + E | XXXX (X, X)X | Id | Name | GroupType (EPC+/RAN) | GroupID | GroupArray [] | Descriptor link | Destination |
| Rule | C + E | XXXX (X, X)X | Id | Name | GroupType (EPC+/RAN) | GroupID | GroupArray [] | Descriptor link | Destination |
| Monitor | C + E | XXXX (X, X)X | Id | Name | GroupType (EPC/RAN) | GroupID | GroupArray [] | Descriptor link | Destination |
| Notify | C + E | XXXX (X, X)X | Id | Name | GroupType (EPC+/RAN) | GroupID | GroupArray [] | Descriptor link | Destination |

Policy control and rules associated with the user plane for usage of resource is notified to OSS/BSS modules through the notification interfaces using the CMS.

Admission, control, and reservation of CloudEPC resources are dynamically managed through interactions among different modules depending on the request or response calls for reservations and the release of resources by tenants, and their security and permission levels.

CloudEPC has a separation between the data and control planes and the management plane. The EPC clusters work with different VNFs in the logical domain at the service plane.

A VCG isolates groups of radio cells and/or core EPC or EPC cloud clusters. Group type of EPC and RAN with additional APN attributes of mobile originating or mobile terminating connections or sessions are bundled as a resource for service usage and billing.

Authentication and authorization are performed. QuantumLeap may use the Keystone identity service of OpenStack™ as the default authentication service. When Keystone is enabled, users submitting requests to the QuantumLeap service provide an authentication token in X-Auth-Token request header. The token may have been obtained by authentication with Keystone. When keystone is enabled, the tenant ID for resources in the create requests may not be used, because the tenant identifier is derived from the authentication token. In an example, only administrative users create resources on behalf of a different tenant.

QuantumLeap may use information received from Keystone to authorize user requests. QuantumLeap handles two kinds of authorization policies. Operation based policies specify access criteria for specific operations, optionally with fine-grained control over specific attributes. Resource based policies determine whether access to specific resources are granted or not granted in accordance with the permissions configured for the resource, for example for the network resource. Other authorization policies may be used.

An embodiment performs GTP control for VxLAN over an Sx interface in mobile CloudEPC for tunneling between endpoints. Point-to-point (PTP) is a group of IP based communications protocols for GPRS for networks. In 3GPP architectures, GTP and Proxy Mobile IPv6 based interfaces are specified on various interface points. GTP may be decomposed into separate protocols, GTP-C, GTP-U, and GTP'. GTP-C is used within the GPRS core network for signaling between gateway GPRS support nodes (GGSN) and serving GPRS support nodes (SGSN). Thus, SGSN activates a session on a user's behalf and deactivates the session to adjust quality of service (QoS) parameters, or to update a session for a subscriber who has just arrived from another SGSN. GTP-U is used for carrying user data within the GPRS core network and between the radio access network and the core network. The user data transported may be packets of IPv4, IPv4, or point-to-point protocol (PPP) formats. GTP' uses the same messaging structures as GTP-C and GTP-U, but is used for carrying charging data from the charging data function (CDF) of the Global System for Mobile Communications (GSM) or UMTS network to the charging gateway function (CGF).

In an embodiment, mobile network elements are controlled through RESTful APIs. This may be through CMS, optionally through EMS. Alternatively, the mobile network elements are controlled through adapters where the cloud management does not deliver the orchestration for a network.

An embodiment is operated in a flow-based manner, where messages flow through the queueing module RabbitMQ while the persistence of metadata is achieved through the per module database in MySQL. In an example, a QuantumLeap command is issued over the command line interpreter (CLI) or a horizon plug-in, which drives the producer threads, which are dispatched to QuantumLeap topic/channel/queue via asynchronous messaging queueing protocol (AMQP). The command is propagated through the Nova scheduler or RPC callback, which returns to the QuantumLeap engine to obtain service from worker threads.

Worker threads translate from the scheduler to request or response calls to CloudEPC or physical nodes, for example via OpenStack™ or an EMS. CloudEPC includes EPC functions hosted by a cloud or on clusters. CloudEPC is a virtual image with composite or multiple images made of a vMME, a vSGW, a vPGW) a vPCRF, and/or a vHSS.

In an example, a RESTful programming interface is used to manage northbound MNFV service objects and corresponding southbound calls for CloudEPC clusters and/or physical nodes. Plugins for SB and NB API feature additions which are used to handle the fixed or wired portion of the virtual network cluster, for example to set up VLANs or VxLANs.

An example has a plug-able architecture where the REST API is backed by various entities to create a cloud class mobile networking virtual cluster. Additional plug-ins may be added. Also, users may be able to use different EPC cluster implementations. Some example plug-ins include PAO, MNO, MVNO, <geolocation (GeoLoc)>=(Zone, Site, data center, Cluster, Node, Server), APN, VNF, Subscriber, and Session. VNF is invoked through SB, while PAO, MNO, MVNO, GeoLoc, APN, SUB, and session are invoked through NB. The VNF may be sub-classed to support EPC cluster, MME, SGW, and PGW for SB to pass through invocation.

In one example, to create an MVNO, a JSON Create Request may be used. When CreateAndAssign is used, a site is a parameter. Alternatively, the MVNO is created without a site. An example create MVNO is given by:

```
{
    "MVNO":
        {
            "name": "MNO_USA",
            "admin_state_up": false }
        }
}
```

In response, a create response may be received. An example JSON Create Response is given by:

```
'status': '201'
'content-length': '194'
'content-type': 'application/json;
{
    "MVNO": {
        "admin__state__up": true,
        "id": "850d3f2c-f0a5-4f8b-b1cf-5836fc0be940",
        "name": "MNO__USA",
        "shared": false,
        "status": "ACTIVE",
        "site": [ ],
        "tenant__id": "f667b69e4d6749749ef3bcba7251d9ce"
    }
}
```

An example EPC response is given by:

```
HTTP/1/1 200 Accepted
Content-Type application/json
Content-Length 204
{
  "epc-network":
        {
              "status": "ACTIVE",
              "subnets": [ ],
              "name": "epc1-net",
              "admin_state_up": true,
              "tenant_id": "388a70781bae4ca895f17b7f6293eb70",
              "stared": false, "id": "2a4017ef-31ff-496a-9294-
              e96ecc3bc9c9"
        }
}
```

In one example, the application layer notification implementation leverages OpenStack™ Ceilometers' events registration mechanisms. In an example, QuantumLeap registers an S1 interface with id="35b17138-b364-4e6a-a131-8f3099c5be68," and sets an S1 peak to not exceed S1HighCap, for example 10 Mbs. When S1-Peak>S1HighCap, the application receives an alert, and decides whether to add another S1-Interface to double the capacity of the eS1-Interface. An example Json meter sample of an application layer notification (ALN) is given by:

```
{
  "counter_name": "S1-interface",
  "counter_type": "gauge",
  "counter_unit": "S1-Peak",
  "counter_volume": 1.0 GB,
  "message_id": "5460acce-4fd4-480d-ab18-9735ec7b1996",
  "project_id": "35b9431c1-8d69-4ad3-803a-8d4a6b89fd36",
  "resource_metadata": {
        "name1": "value1",
        "name2": "value2"
  },
  "source": "openstack",
  "timestamp": "2013-10-08T12:32:07.081786",
  "user_id": "efd87807-12d2-4b38-9c70-5f5c2ac427ff"
}
```

A combination of heat and ceilometer may be used for the ALN, which may use externally defined resources such as:

```
{
      "links": [
            {
                  "href": http://localhost:8777/v2/resources/
bd9431c1-8d69-4ad3-803a-8da6b89fd36,
                  ""rel": "self"
            }
      ],
      "metadata": {
            "name1": "value1",
            "name2": "value2"
      },
      "project_id": "35b17138-b364-4e6a-a131-8f3099c5be68",
      "resource_id": "bd9431c1-8d69-4ad3-
      803a-8d4a6b89fd36",
      "timestamp": "2013-10-08T12:32:06.877872",
      "user_id": "efd87807-12d2-4b38-9c70-5f5c2ac427ff"
}
```

An embodiment QuantumLeap API is extensible. Extensions facilitate the introduction of new features in the API without a version change. Also, extensions facilitate the introduction of vendor specific niche functionality and provide a proving ground for experimental functionalities. Applications may programmatically determine which extensions are available by performing a GET command on the v1.0/extensions URI. Extensions may be queried individually by a unique alias by performing a GET operation on the /v1.0/extensions/alias_name. Existing core API resources may be extended with new actions or extra attributes. Also, new resources may be added as extensions. Extensions may have tags which prevent clash with other extensions, defining attributes and/or resources with the same name, with core resources and attributes. Availability of an extension may depend on the deployment and specific plug-in usage.

When a failure occurs while processing a request, the QuantumLeap API returns an error response. QuantumLeap uses standard HTTP error codes. 4xx errors indicate problems in a particular request sent by a client. Table 7 illustrates some example errors. Users submitting a request to the QuantumLeap API may also receive a 401 unauthorized error when invalid credentials are provided and a 403 Forbidden error when the user cannot access a specific resource or perform the requested operation.

TABLE 7

| Error |
|---|
| 4>\|400 Bad Request |
| 2>\|404 Not Found |
| 3>\|409 Conflict |
| 2>\|400 Bad Request |
| 500 Internal server error |
| 503 Service Unavailable |

An example JSON Request for CreateAndAssign Site is given by:

```
{
"zone": [
      "zone_global": {
                  "id": "91e47a56-7508-46fe-afc9-fc454e8580e1"
                  "name": "MNO_US",
            }
      "zone_local": {
                        "id": "",
                        "name": "Santa_Clara",
                  }
            ],
      "site": [
            {
                  "pools_local": [
                        {
                              "end": "10.0.3.254",
                              "start": "10.0.3.2"
                        }
                  ],
                  "cidr": "10.0.3.0/24",
                  "dns_nameservers": [ ],
                  "enable_dhcp": true,
                  "gateway_ip": "10.0.3.1",
                  "site_routes_local": [ ],
                  "id": "91e47a56-7508-46fe-afc9-fc454e8580e1",
                  "ip_version": 4,
                  "name": "Santa_Clara",
                  "network_id": "1a6f6006-9e0b-4f99-984c-
                  96787ae66363",
                  "tenant_id":
                  "f667b69e4d6749749ef3bcba7251d9ce"
            },
            {
                  "pools_global": [
                        {
                              "end": "10.0.2.254",
                              "start": "10.0.2.2"
                        }
```

-continued

```
        ],
        "cidr": "10.0.1.0/24",
        "dns_nameservers": [ ],
        "enable_dhcp": true,
        "gateway_ip": "10.0.2.1",
        "site_routes_global": [ ],
        "id": "e3c3620c-9d24-4470-b226-739da2f617c0",
        "ip_version": 4,
        "name": "",
        "network_id": "1a6f6006-9e0b-4f99-984c-
        96787ae66363",
        "tenant_id":
        "f667b69e4d6749749ef3bcba7251d9ce"
      }
    ]
}
```

An example JSON response for CreateAndAssign Site is given by:

```
{
    "zone": [
        "zone_global": {
                "id": "91e47a56-7508-46fe-afc9-
                fc454e8580e1"
                "name": "MNO_US",
        }
        "zone_local": {
                "id": "",
                "name": "Santa_Clara",
        }
        ],
    "site": [
        {
            "pools_local": [
                {
                    "end": "10.0.3.254",
                    "start": "10.0.3.2"
                }
            ],
            "cidr": "10.0.3.0/24",
            "dns_nameservers": [ ],
            "enable_dhcp": true,
            "gateway_ip": "10.0.3.1",
            "site_routes_local": [ ],
            "id": "91e47a56-7508-46fe-afc9-fc454e8580e1",
            "ip_version": 4,
            "name": "Santa_Clara",
            "network_id": "1a6f6006-9e0b-4f99-984c-
            96787ae66363",
            "tenant_id":
            "f667b69e4d6749749ef3bcba7251d9ce"
        },
        {
            "pools_global": [
                {
                    "end": "10.0.2.254",
                    "start": "10.0.2.2"
                }
```

-continued

```
            ],
            "cidr": "10.0.1.0/24",
            "dns_nameservers": [ ],
            "enable_dhcp": true,
            "gateway_ip": "10.0.2.1",
            "site_routes_global": [ ],
            "id": "e3c3620c-9d24-4470-b226-739da2f617c0",
            "ip_version": 4,
            "name": "",
            "network_id": "1a6f6006-9e0b-4f99-984c-
            96787ae66363",
            "tenant_id":
            "f667b69e4d6749749ef3bcba7251d9ce"
        }
    ]
}
```

An example Json Create APN is given by:

```
{
    "apn":
        {
            "name": "broadband",
            "admin_state_up": false,
            "group_type": epc,
            "group_id": epc1,
            "group_array": [subnet1, subnet2, subnet3],
            "descriptor_link": http://mnfv.org/quantamleap/
            apn/broadband,
            "destination": epc1,
        }
}
```

An example JSON Response APN is given by:

```
'status': '201'
'content-length': '194'
'content-type': 'application/json;
{
    "apn": {
        "admin_state_up": true,
        "id": "850d3f2c-f0a5-4f8b-b1cf-5836fc0be940",
        "name": "broadband",
        "shared": false,
        "status": "ACTIVE",
        "subnets": ["10.0.1.0/24", "10.0.2.1/24", "10.0.2.2/24",],
        "tenant_id": "f667b69e4d6749749ef3bcba7251d9ce"
    }
}
```

An example Json Create VNF is given by:

```
{
    "vnf": {
        "id": "",
        "function-name": "epc",
        "imagelink": "http://mnfv.org/openstack/images/70a599e0-31e7-49b7-
        b260-868f441e862b",
        "descriptor": "pgw.xml",
        "flavorRef": "http://mnfv.org/openstack/flavors/1",
        "descriptorlink": "http://mnfv.org/openstack/images/epc/sclab1/",
        "destination": "<geo_loc>",
        "metadata": {
            "My vnf Name": "epc"
        },
        "name": "new-server-test",
```

-continued

```
            "personality": [
                {
                    "contents":
                    "ICAgICAgDQoiQSBjbG91ZCBkb2VzIG5vdCBrbm93IH
                    doeSBpdCBtb3ZlcyBpbiBqdXN0IHN1Y2ggYSBkaXJlY3
                    Rpb24gYW5kIGF0IHN1Y2ggYSBzcGVlZC4uLkl0IGZlZ
                    WxzIGFuIGltcHVsc2lvbi4uLnRoaXMgaXMgdGhlIHBsY
                    WNlIHRvIGdvIG5vdy4gQnV0IHRoZSBza3kga25vd3Mgd
                    GhlIHJ1YXNvbnMgYW5kIHRoZSBwYXR0ZXJucyBiZW
                    hpbmQgYWxsIGNsb3VkcywgYW5kIHlvdSB3aWxsIGtub
                    3csIHRvbywgd2hlbiB5b3UgbGlmdCB5b3Vyc2VsZiBoa
                    WdoIGVub3VnaCB0byBzZWUgYmV5b25kIGhvcml6b25
                    zLiINCg0KLVJpY2hhcmQgQmFjaA==",
                    "path": "/etc/banner.txt"
                }
            ]
            "security_groups": [{"name": "sg1"}]
        }
}
```

An example JSON Response VNF is given by:

```
'status': '201'
'content-length': '254'
'content-type': 'application/json;
{
        "vnf": {
            "adminPass": "MVk5HPrazHcG",
            "id": "5bbcc3c4-1da2-4437-a48a-66f15b1b13f9",
            "function-name": "epc",
            "imagelink": "http://mnfv.org/openstack/images/70a599e0-31e7-49b7-
            b260-868f441e862b",
            "descriptor": "pgw.xml",
            "flavorRef": "http://mnfv.org/openstack/flavors/1",
            "descriptorlink": "http://mnfv.org/openstack/images/epc/sclab1/",
            "destination": "<gzone/lzone/site/dc/cluster/vnf_instance/>",
            "vnf_instance_links": [
                {
                    "href": "http://mnfv.org/v2/openstack/servers/5bbcc3c4-
                    1da2-4437-a48a-66f15b1b13f9",
                    "rel": "self"
                },
                {
                    "href": "http://mnfv.org/openstack/servers/5bbcc3c4-1da2-
                    4437-a48a-66f15b1b13f9",
                    "rel": "bookmark"
                }
            ]
        }
}
```

An example JSON Request and Authentication SUB is given by:

```
{
  "user": {
    "id": "u1000",
    "username": "sub_01",
    "number":"555-555-5555",
    "IMEI": "555-555-5555",
    "IMSI": "555-555-5555",
    "grouptype": "indi",
    "grouparray": "apn=broadband",
    "enabled": true
  }
{
  "auth":{
    "passwordCredentials":{
          "username":"sub_01",
          "password":"mypass"
    },
    "tenantName":"sclab"
```

-continued

```
    }
  }
```

An example JSON Response SUB is given by:

```
'status': '201'
'content-length': '221'
'content-type': 'application/json;
{
        "access":{
            "token":{
                "id":"ab48a9efdfedb23ty3494",
                "expires":"2013-12-09T03:32:15-05:00",
                "tenant":{
                    "id":"t1000",
                    "username": "sub_01"
                    "tenantname": "sclab",
                }
```

-continued

```
        },
        "profile":{
            "id":"indi",
            "name":"sclab_user",
            "roles":[{
                        "id":"100",
                        "name":"sub_01_indi"
                    },
                    {
                        "id": "fan",
                        "name":"sub_01_fan",
                        "tenantId":"t1000"
                    }
            ],
            "roles_links":[ ]
        },
        "user_profile":[{
            "name":"sub_01_indi",
            "type":"indi",
                        "endpoints":[{
                        "tenantId":"t1000",
                        "descriptorURL":"https://
                        mnfv.org/north/v2/t1000",
                        "profileURL":"https://
                        mnfv.org/north/internal/v2/t1000",
                    },
            ],
            "endpoints_links":[ ]
            ]
            }
    }
}
```

An example JSON Create Operation or Session is given by:

```
"session": {
    "id": "u1000",
    "username": "sub_01",
    "number": "555-555-5555",
    "IMEI": "555-555-5555",
    "IMSI": "555-555-5555",
    "grouptype": "indi",
    "grouparray": "apn=broadband",
    "enabled": true,
    "profilename": "sub_01",
    "profilelink": "http://mnfv.org/quantamleap/profile/sub_01",
    "maxunits": "10GB"
    "activeunits": "8GB"
}
```

An example JSON Response Operation or session is given by:

```
'status': '201'
'content-length': '89'
'content-type': 'application/json;
{
"session": {
    "id": "u1000",
    "username": "sub_01",
    "number": "555-555-5555",
    "IMEI": "555-555-5555",
    "IMSI": "555-555-5555",
    "grouptype": "indi",
    "grouparray": "apn=broadband",
    "enabled": true,
    "profilename": "sub_01",
    "profilelink": "http://mnfv.org/quantamleap/profile/sub_01",
    "maxunits": "10GB"
    "activeunits": "8GB"
    "session_id": "12345-56789"
    "limitunits": "8GB"
```

The VNF API is used for EPC internal interfaces and linking. An API is described as:

VNF id function-name Image Image-link Descriptor Descriptor-link Destination. API attributes are:

```
VNF=MME-Instance-id, function-name=Program, Image=
Script image-link=http://mysite.org/mme1.sh Descriptor=mme.xml
Descriptor-link=http://mysite.org/mme1.xml Destination=MME-
Instance-IP-address
```

The image name "Script" refers to pre and post installation instantiation procedures depending on the function name. In this example, the function name is program and the Instance ID of VNF is available. Thus, it is a post installation script to run to configure the interfaces and links in the descriptor. The descriptor mme1.xml or 5 node epc.xml contains the control plane interfaces and data plane interfaces. The control plane interfaces or control input output CIO may include S1-MME-eNB to MME, S6a-MME to HSS, S11-MME to S-GW, and Sp-HSS to PCRF. The data plane interfaces or data input output DIO includes S1-U-eNB to S-Gw, S5-S-GW to P-GW, S8-S-GW to P-GW, SGi-Internet Access, Gx-P-GW to PCRF, and Gxc-S-GW to PCRF. Attributes include distance bandwidth BW, delay D, round trip time RTT, jitter J, service level QCI 15, and flavor small/medium/large.

An embodiment provides a standardized, programmatic interface to the mobile domain. A standard northbound API is used for MNO/MVNO/EMS, while a standard southbound API is used for mapping then NB to SB laaS thorough a CMS. There may be integration to OpenStack™.

In one example, MNFV is implemented in a system using hardware logic blocks. Alternatively, MNFV is implemented as software executing on a processor, controller, application specific integrated circuit, etc. In an additional embodiment, a MNFV is implemented as a combination of software and hardware.

Figure 20:
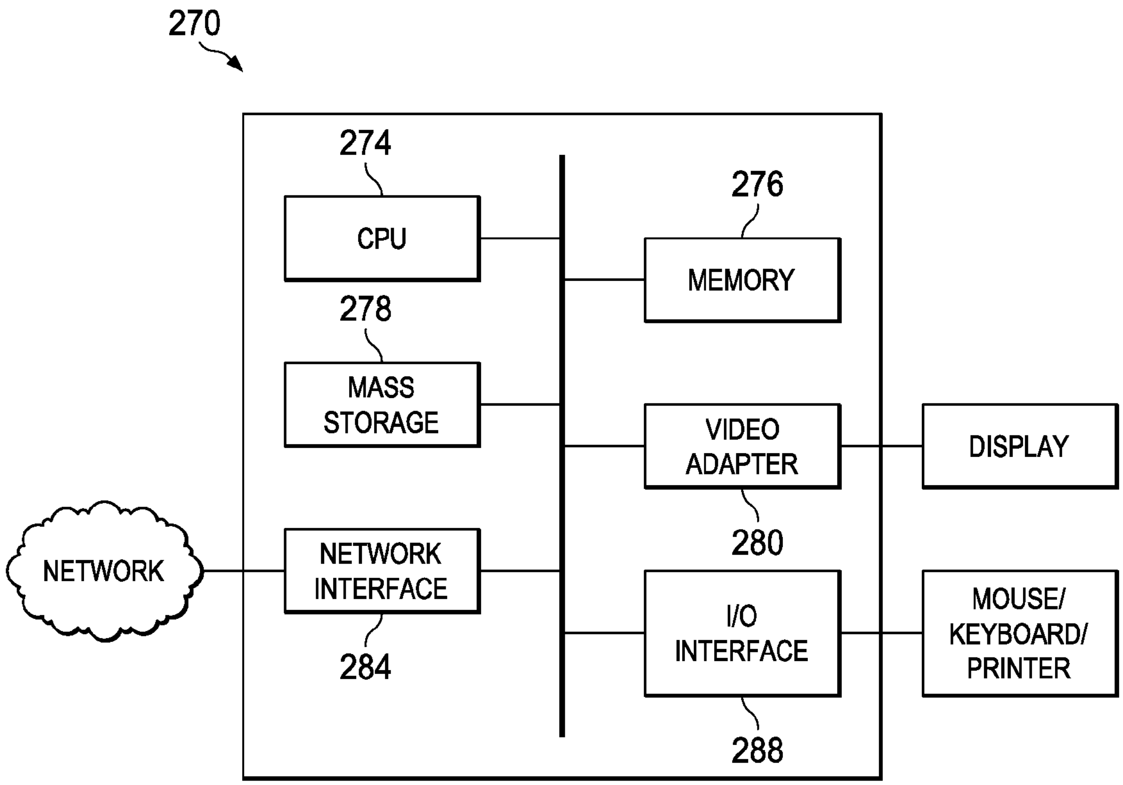
FIG. 20 illustrates a block diagram of an embodiment general-purpose computer system.

FIG. 20 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of non-transitory storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for mobile network function virtualization (MNFV), the method comprising:
- creating, by a tenant, an evolved packet core (EPC) cluster, comprising creating the EPC cluster by a first application program interface (API);
- associating a sub-network with the EPC cluster;
- booting, by the tenant, a virtual machine (VM);
- attaching the VM to the EPC cluster;
- transmitting a plug-in request to an element management system (EMS) by a second API, wherein the plug-in request is destined for a network; and
- performing geographical partitioning of resources, wherein performing geographical partitioning comprises:
  - creating a global zone;
  - associating a site with the global zone;
  - creating a local zone;
  - associating the local zone with the global zone;
  - associating the local zone with the site; and
  - performing subscriber provisioning in accordance with the global zone, the local zone, and the site.

2. The method of claim 1, further comprising:
- deleting the VM; and
- deleting the EPC cluster.

3. The method of claim 1, wherein attaching the VM to the EPC cluster comprises contacting a cloud management system (CMS).

4. The method of claim 1, further comprising creating a port of the VM.

5. The method of claim 4, further comprising:
- creating a network interface controller (NIC); and
- attaching the NIC to the port.

6. The method of claim 5, further comprising deleting the port.

7. The method of claim 4, further comprising determining an internet protocol (IP) address of the port.

8. The method of claim 1, further comprising transmitting policy control and rules for a user plane to an operation support system (OSS).

9. The method of claim 1, further comprising accessing a database of authentication information.

10. The method of claim 1, further comprising testing the EPC cluster.

11. The method of claim 1, further comprising creating an access point name (APN) for a site.

12. The method of claim 1, further comprising transmitting a create topology message to a compute module.

13. The method of claim 1, further comprising creating a policy by a third API.

14. A tenant computer comprising:
- a processor; and
- a non-transitory computer readable storage medium storing programming for execution by the processor, the programming including instructions to:
  - create an evolved packet core (EPC) cluster, comprising creating the EPC cluster by a first application program interface (API),
  - associate a sub-network with the EPC cluster,
  - boot a virtual machine (VM),
  - attach the VM to the EPC cluster,
  - transmit a plug-in request to an element management system (EMS) by a second API, wherein the plug-in request is destined for a network; and
  - perform geographical partitioning of resources, wherein performing geographical partitioning comprises:
    - creating a global zone;
    - associating a site with the global zone;
    - creating a local zone;
    - associating the local zone with the global zone;
    - associating the local zone with the site; and
    - performing subscriber provisioning in accordance with the global zone, the local zone, and the site.

15. The tenant computer of claim 14, wherein the instructions further comprise instructions to create a port of the VM.

* * * * *